United States Patent
Jäger et al.

[11] Patent Number: 5,463,031
[45] Date of Patent: Oct. 31, 1995

[54] REACTIVE DYESTUFFS

[75] Inventors: Horst Jäger, Leverkusen; Frank-Michael Stöhr, Odenthal; Karl K. Schündehütte, Leverkusen, all of Germany

[73] Assignee: Bayer Aktiengesellschaft, Leverkusen, Germany

[21] Appl. No.: 226,435

[22] Filed: Apr. 12, 1994

Related U.S. Application Data

[63] Continuation of Ser. No. 710,244, Jun. 3, 1991, abandoned, which is a continuation of Ser. No. 359,802, May 31, 1989, abandoned.

[30] Foreign Application Priority Data

Jun. 10, 1988 [DE] Germany ............... 38 19 752.9

[51] Int. Cl.$^6$ .............. C09B 62/503; C09B 62/04; C09B 62/20; D06P 1/38
[52] U.S. Cl. .............. 534/618; 534/617; 534/623; 534/624; 534/627; 534/632; 534/634; 534/635; 534/636; 534/637; 534/638; 544/75; 544/76; 544/189; 544/294; 8/549
[58] Field of Search ............... 534/618, 632, 534/634, 635, 636, 637, 638; 544/75, 76, 189

[56] References Cited

U.S. PATENT DOCUMENTS

| | | | |
|---|---|---|---|
| 4,560,388 | 12/1985 | Rohrer | 534/638 X |
| 4,746,732 | 5/1988 | Tzikas | 534/638 X |
| 4,777,247 | 10/1988 | Henk | 534/626 X |
| 4,935,501 | 6/1990 | Tzikas | 534/635 X |
| 4,988,801 | 1/1991 | Hihara et al. | 534/642 X |
| 5,093,481 | 3/1992 | Henk et al. | 534/632 |
| 5,274,083 | 12/1993 | Herd et al. | 534/618 |

FOREIGN PATENT DOCUMENTS

| | | | |
|---|---|---|---|
| 168703 | 1/1986 | European Pat. Off. | 534/632 |
| 0192964 | 9/1986 | European Pat. Off. | |
| 0203505 | 12/1986 | European Pat. Off. | 534/637 |
| 272523 | 6/1988 | European Pat. Off. | 534/632 |
| 286113 | 10/1988 | European Pat. Off. | 534/632 |
| 3201114 | 7/1983 | Germany | 534/637 |
| 3318146 | 11/1984 | Germany | 534/637 |
| 3503567 | 8/1986 | Germany | 534/637 |

OTHER PUBLICATIONS

Exhaustion Dyeing of Cellulosics with Reactive Dyes, P. F. Bell, Textile Institute and Industry, Jan. 1967, p. 13.
The Chemistry of Synthetic Dyes, Venkatamaran, vol. I, 1952, pp. 495 and 499.

*Primary Examiner*—Johann Richter
*Assistant Examiner*—Fiona T. Powers
*Attorney, Agent, or Firm*—Sprung Horn Kramer & Woods

[57] ABSTRACT

Reactive dyestuffs of the formula

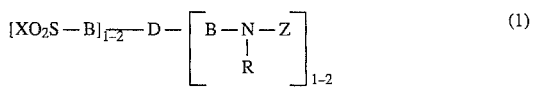

in which the substituents have the meanings given in the description are highly suitable for the dyeing and printing of cellulose materials and nitrogen-containing materials.

They produce dyeings and prints having good wet and light fastness properties.

3 Claims, No Drawings

REACTIVE DYESTUFFS

This application is a continuation of application Ser. No. 07/710,244, filed Jun 3,1991, now abandoned which is a continuation of application Ser. No. 07/359,802, filed May 31, 1989, now abandoned.

The present invention relates to reactive dyestuffs of the formula

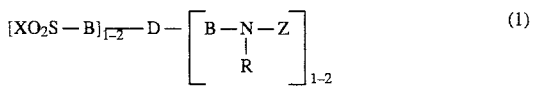

in which
- D is the radical of a dyestuff of the metal-free monoazo, metal-containing monoazo, metal-free secondary disazo, anthraquinone, formazan and dioxazine series,
- X is $CH=CH_2$ or $CH_2CH_2-Y$ in which
- Y is a radical which can be eliminated by alkali, for example $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2-C_6H_4CH_3$, $N(CH_3)_3\,^+A^-$,
- B is a direct bond or a bridge member to a ring carbon atom of an aromatic-carbocyclic ring or to a ring carbon atom or nitrogen atom of an aromatic-heterocyclic ring in D
- R is H or substituted or unsubstituted $C_1-C_4$-alkyl
- Z is a fibre-reactive radical of the formula

in which
- V is H, Cl or Br
- $U_1$, $U_2$ are H, Cl, F with the proviso that $U_1$ is different from $U_2$ and one of the radicals represents F.

Examples of suitable bridge members B, which can be identical or different, are:

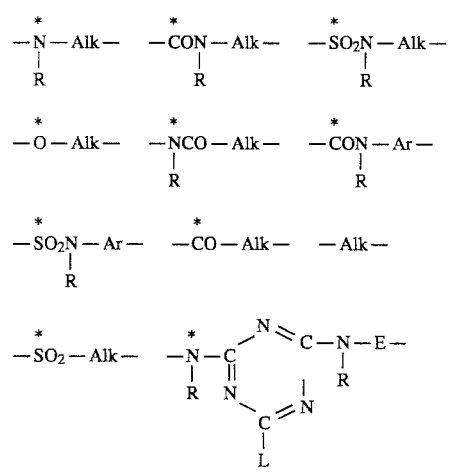

—Alk—Ar— in which the star indicates the point of linkage with D,
- R has the abovementioned meaning,
- Alk is straight-chain or branched $C_1-C_6$-alkylene which is optionally interrupted by heteroatoms or groupings which contain heteroatoms such as N, O or S,
- Ar is substituted or unsubstituted phenylene or naphthylene or the radical of a diphenyl or stilbene,
- E is Alk or Ar or -Alk-Ar- in which Alk or Ar can contain further substituents, for example F, Cl, Br, $C_1-C_4$-alkyl, $C_1-C_4$-alkoxy, carboxyl or sulpho,
- L is F, Cl, Br, substituted or unsubstituted amino, OH, $C_1-C_4$-alkoxy, substituted or unsubstituted phenoxy or $C_1-C_4$-alkylthio.

The radical D in formula (1) can be substituted in the usual manner. Examples of further substituents on the radical D are: alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, acylamino groups having 1 to 4 carbon atoms, such as acetylamino, propionylamino or benzoylamino, amino, alkylamino having 1 to 4 carbon atoms, such as methylamino, ethylamino, propylamino, isopropylamino or butylamino, phenylamino, N,N-di-β-hydroxyethylamino, N,N-di-β-sulphatoethylamino, sulphobenzylamino, N,N-disulphobenzylamino, alkoxycarbonyl having 1 to 4 carbon atoms in the alkoxy radical, such as methoxycarbonyl or ethoxycarbonyl, alkylsulphonyl having 1 to 4 carbon atoms, such as methylsulphonyl or ethylsulphonyl, trifluoromethyl, nitro, cyano, halogen such as fluorine, chlorine or bromine, carbamoyl, N-alkylcarbamoyl having 1 to 4 carbon atoms in the alkyl radical, such as N-methylcarbamoyl or N-ethylcarbamoyl, sulphamoyl, N-alkylsulphamoyl having 1 to 4 carbon atoms, such as N-methylsulphamoyl, N-propylsulphamoyl, N-isopropylsulphamoyl or N-butylsulphamoyl, N-(4-hydroxyethyl)-sulphamoyl, N,N-di-(β-hydroxylethyl)-sulphamoyl, N-phenylsulphamoyl, ureido, hydroxyl, carboxyl, sulphomethyl or sulpho. Preferably, the radical D contains one or more sulphonic acid groups. Reactive dyestuffs of the formula (1) in which D is the radical of an azo dyestuff contain in particular the substituents methyl, ethyl, methoxy, ethoxy, acetylamino, benzoylamino, amino, chlorine, bromine, ureido, hydroxyl, carboxyl, sulphomethyl or sulpho.

If the radical R is an alkyl radical it is straight-chain or branched; it can be further substituted, for example by halogen, hydroxyl, cyano, $C_1-C_4$-alkoxy, carboxyl or sulpho. Examples of R are the following radicals: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulphomethyl, β-sulphoethyl, aminosulphonylmethyl and β-sulphatoethyl. R is preferably hydrogen, methyl or ethyl.

Examples of fibre-reactive radicals Z are as follows:
2-fluoro-5,6-dichloropyrimidin-4-yl,
6-fluoro-2,5-dichloropyrimidin-4-yl
2-fluoro-5-chloropyrimidin-4-yl
2-fluoro-6-chloropyrimidin-4-yl
2-fluoropyrimidin-4-yl
6-fluoro-5-chloropyrimidin-4-yl
6-fluoro-2-chloro-5-bromopyrimidin-4-yl 6-fluoro-5-bromopyrimidin-4-yl Preference is given to reactive dyestuffs of the formula (1) in which D is the radical of a monoazo dyestuff. In this case, the reactive radicals, that is to say the sulphonyl radical —SO$_2$X and the fluoropyrimidyl radical, are bound to different or to identical radicals of starting components, that is to say diazo and coupling components. The reactive dyestuffs then have, for example, the formula

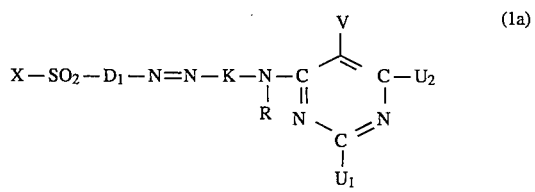

(1a)

or

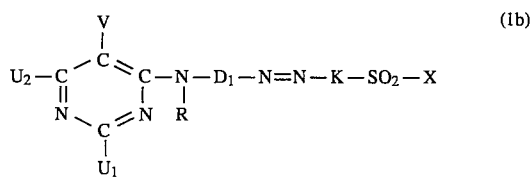

(1b)

in which R, X, U$_1$, U$_2$ and V have the meaning given in formula (1) and D$_1$ is the radical of a diazo component and K is the radical of a coupling component. If two X—SO$_2$— reactive radicals are present, they are bound in particular to the radical of the diazo component; and in the case where the dyestuff molecule contains two fluoropyrimidyl radicals, they are preferably present in the coupling component. Accordingly, tri- and tetrareactive dyestuffs are also possible in accordance with the indices which have been added to the reactive radicals in the formula (1). The above definitions also apply analogously to metal complex azo dyestuffs.

Examples of D$_1$ are preferably phenylene which is unsubstituted or substituted by SO$_3$H, chlorine, C$_1$–C$_4$-alkoxy, C$_1$–C$_4$-alkyl, carbalkoxy or sulphonamido, naphthalene which is unsubstituted or substituted by SO$_3$H, chlorine, C$_1$–C$_4$-alkoxy, or C$_1$–C$_4$-alkyl, 4-(phenylazo)phenylene which is unsubstituted or substituted by SO$_3$H and biphenylene which is unsubstituted or substituted by SO$_3$H.

K represents, for example, the radical of a coupling component of the hydroxybenzene, hydroxynaphthalene, aminobenzene, aminonaphthalene, aminohydroxynaphthalene series, or represents 5-hydroxy-3-methyl-(or -carboxy-)pyrazole, a 6-hydroxy-2-pyridone or an acetoacetylarylide radical which is unsubstituted or ring-substituted by C$_1$–C$_4$-alkyl or C$_1$–C$_4$-alkoxy.

Preferred dyestuffs are those of the formulae

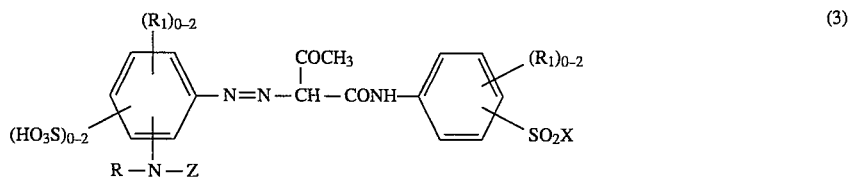

(3)

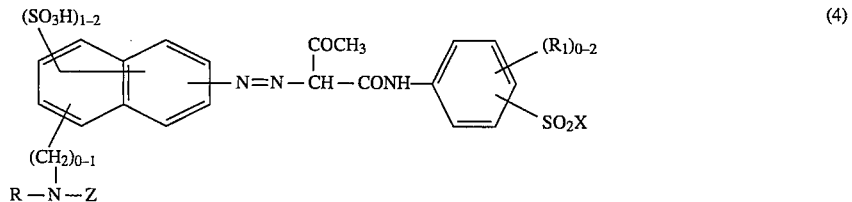

(4)

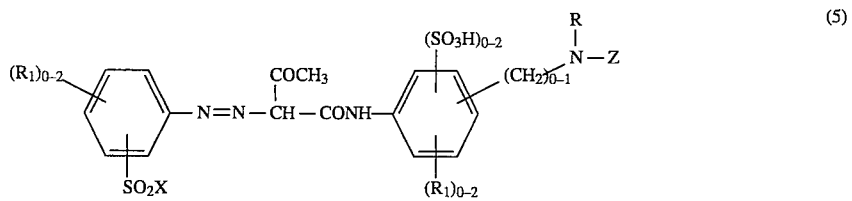

(5)

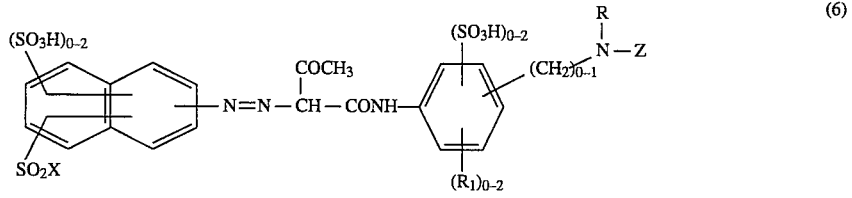

(6)

-continued
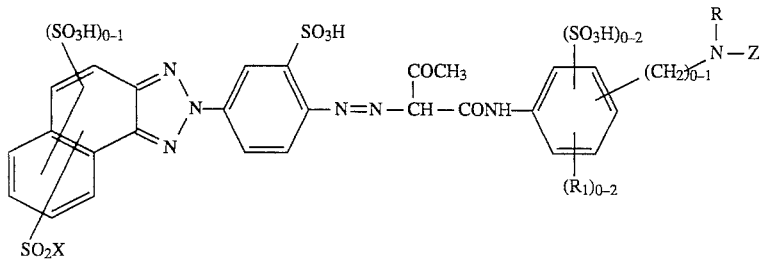 (7)
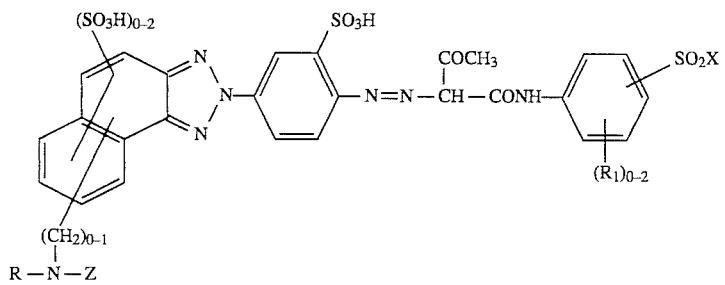 (8)
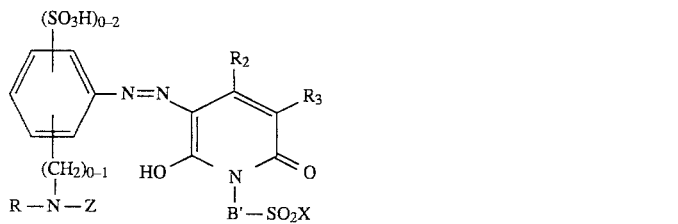 (9)
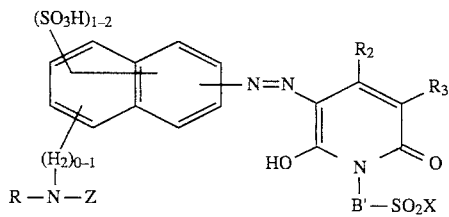 (10)
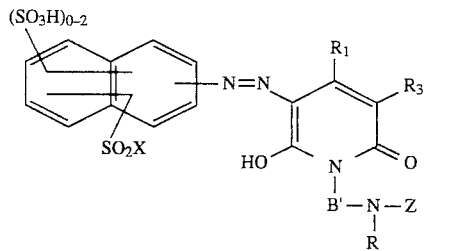 (11)
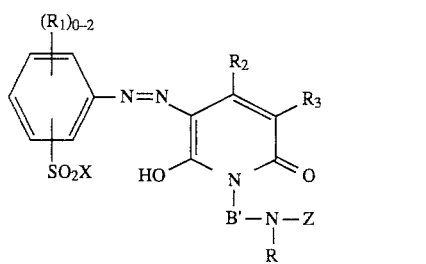 (12)

-continued
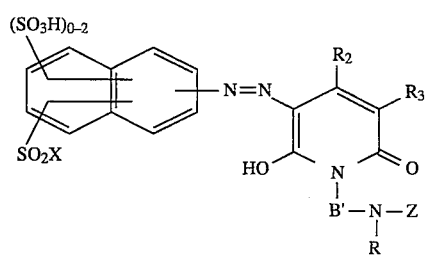
(13)
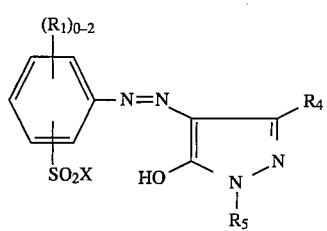
(14)
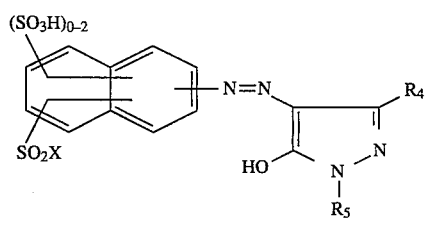
(15)
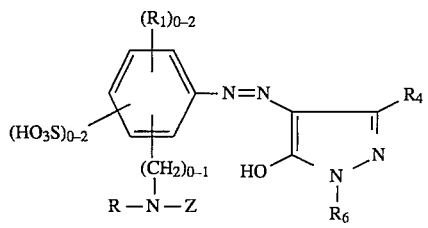
(16)
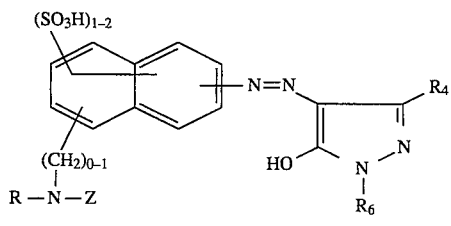
(17)
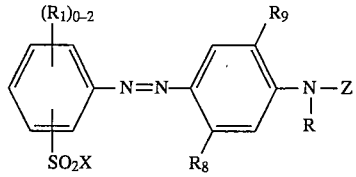
(18)
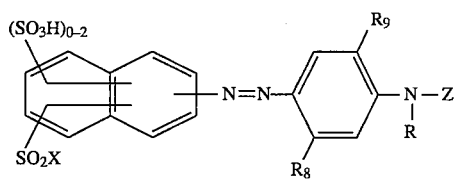
(19)

-continued
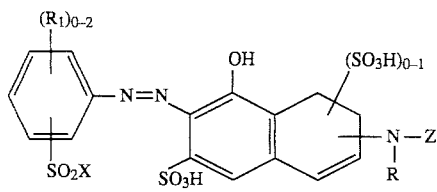
(20)
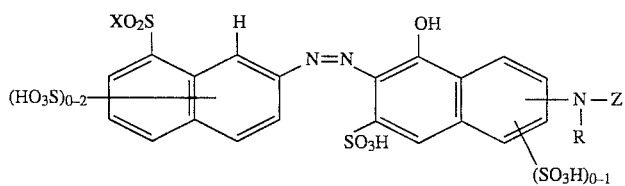
(21)
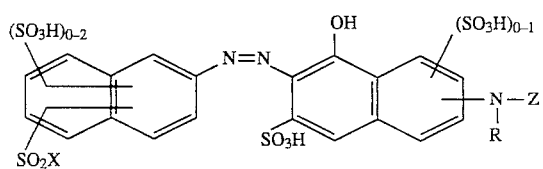
(22)
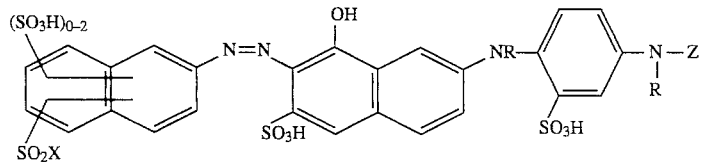
(23)
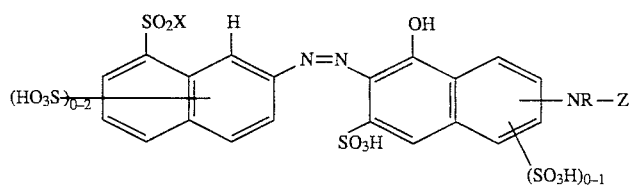
(24)
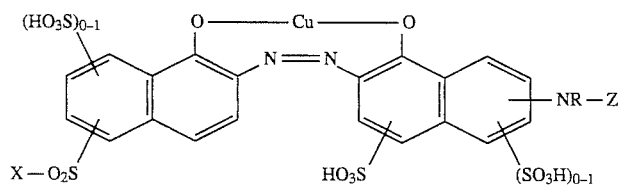
(25)
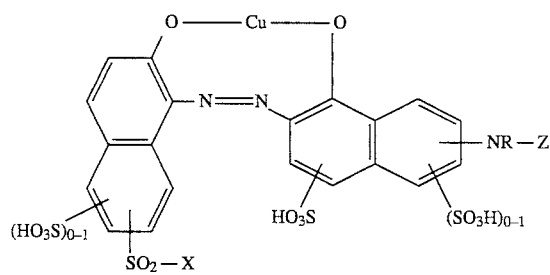
(26)
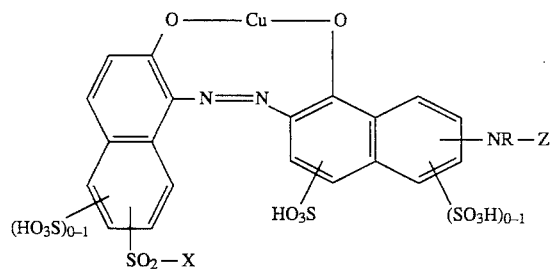
(27)

1:2 metal complexes of dyestuffs in particular the Cr and Co complexes which contain two dyestuffs (28) or one dyestuff (28) and any other desired metal complex-forming dyestuff, in particular an azo or azomethine dyestuff.
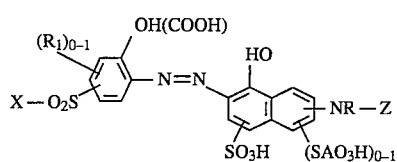
(28)
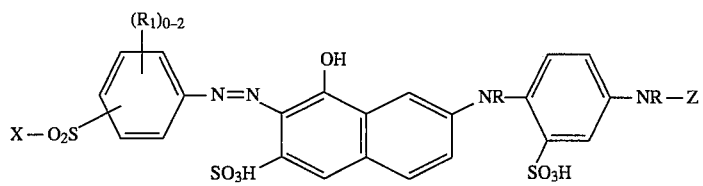
(29)
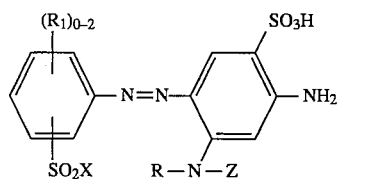
(30)
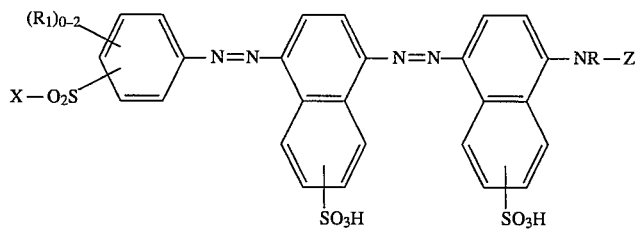
(31)
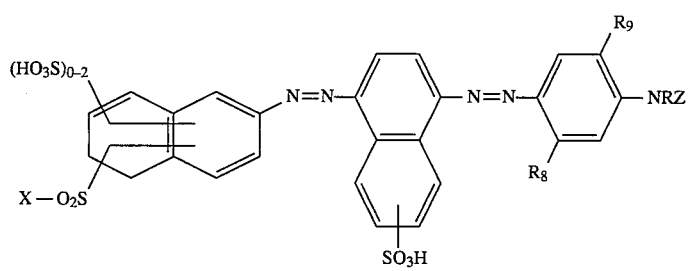
(32)
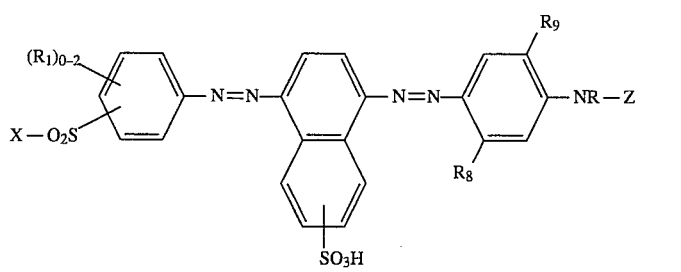
(33)

-continued
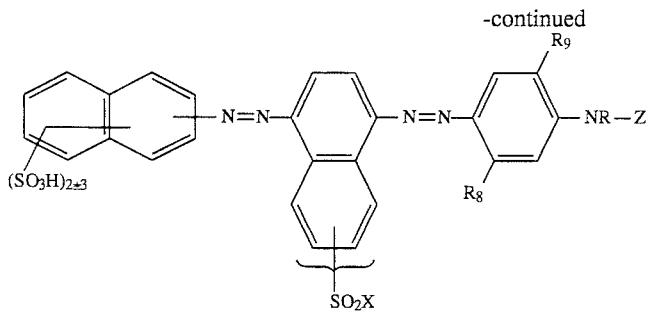
(34)
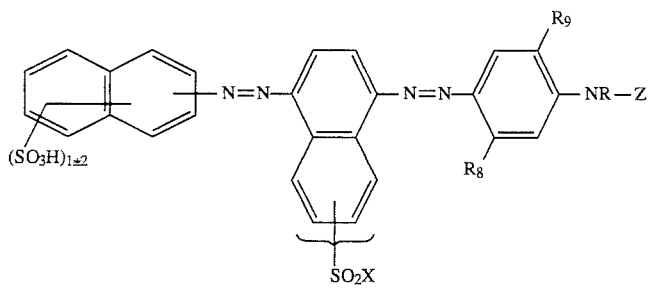
(35)
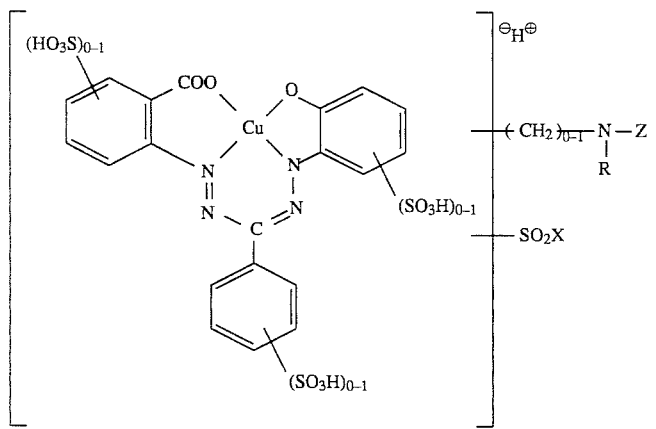
(36)
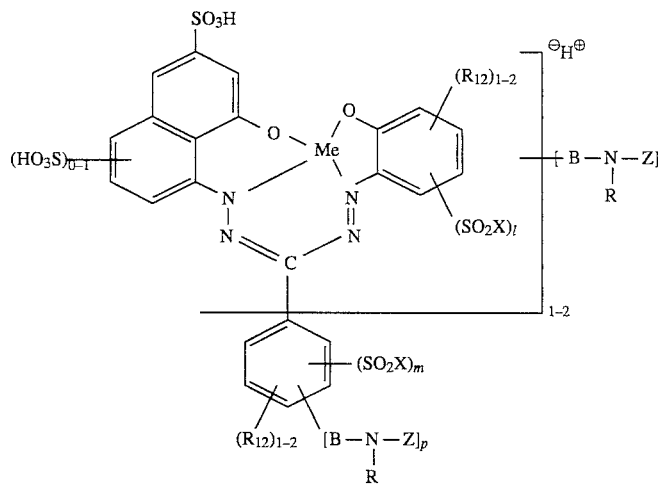
(37)

-continued
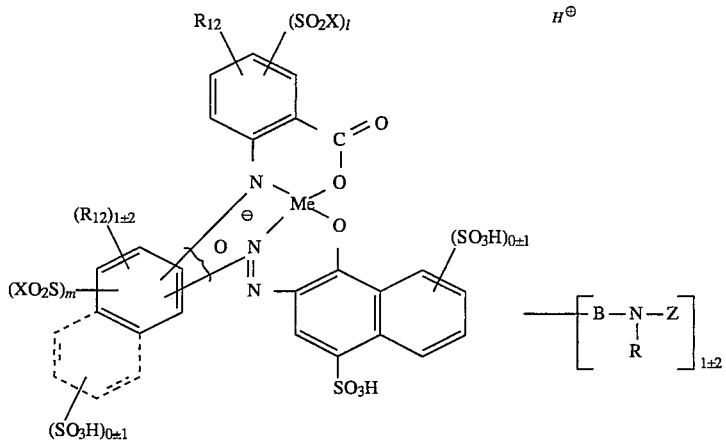   (38)
$H^\oplus$
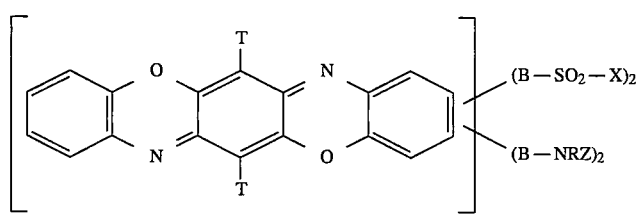   (39)
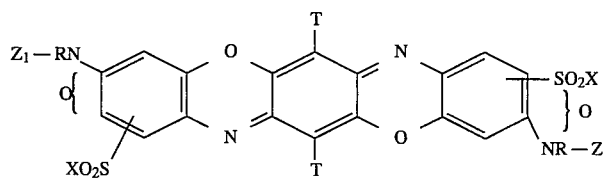   (40)
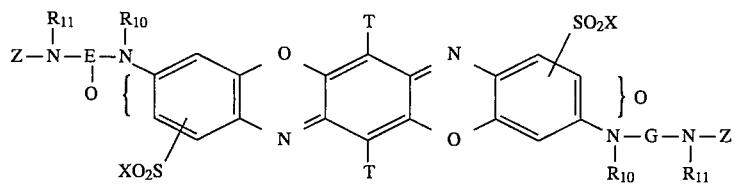   (41)
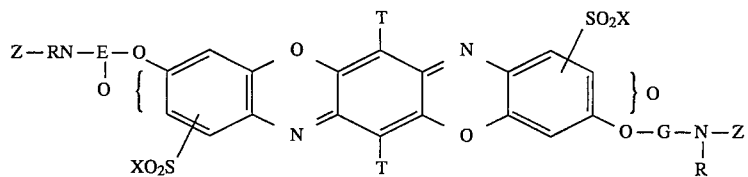   (42)
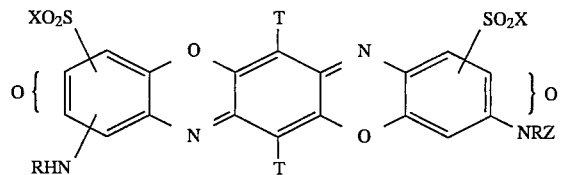   (43)
in which
$R_1$ denotes a substituent, in particular $C_1$–$C_4$-alkyl, $C_1$–$C_4$-alkoxy, Cl, Br, $SO_3H$, COOH,
$R_2$ denotes H, $C_1$–$C_4$-alkyl, COOH, $CH_2SO_3H$,
$R_3$ denotes H, $SO_3H$, $CH_2SO_3H$, Cl, $CONH_2$, mono- and di- $C_1$–$C_4$-alkylcarboxamide, $C_1$–$C_4$-alkylsulphonyl,
$R_4$ denotes $CH_3$, COOH,
$R_5$ denotes

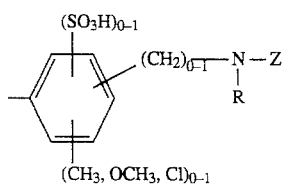

$R_6$ denotes

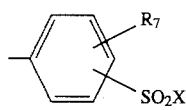

$R_7$ denotes H, $C_1$–$C_4$-alkyl, $C_1$–$C_4$-alkoxy, Cl, Br, COOH, $SO_3H$, $R_8$ denotes H, $C_1$–$C_4$-alkyl, $C_1$–$C_4$-alkoxy, acylamino, in particular $C_1$–$C_4$-alkylcarbonylamino, $C_1$–$C_4$-alkylsulphonylamino, aminocarbonylamino, substituted or unsubstituted phenylcarbonylamino, Cl, Br, $R_9$ denotes H, $C_1$–$C_4$-alkyl, $C_1$–$C_4$-alkoxy, OH, $SO_3H$, $R_{10}$ denotes H, substituted or unsubstituted alkyl, $R_{11}$ denotes H, substituted or unsubstituted alkyl or together with $R_{10}$ denotes alkylene, preferably —$CH_2$—$CH_2$—, T denotes Cl, Br, $C_1$–$C_4$-alkoxy, substituted or unsubstituted phenoxy, $R_{12}$ denotes H, $C_1$–$C_4$-alkyl, $C_1$–$C_4$-alkoxy, OH, halogen, COOH, $NO_2$, $SO_3H$, sulphonamido, $C_1$–$C_4$-alkylcarbonylamino substituted or unsubstituted phenylcarbonylamino, $C_1$–$C_4$-alkylsulphonylamino, substituted or unsubstituted phenylsulphonylamino, Me denotes a divalent metal atom, preferably Fe, Cu, Zn, Co, Ni l, m, n, p denote 0 or 1 where l≠m, n≠p, l≠n and m≠p, G and E, independently of each other, denotes an aliphatic, araliphatic or aromatic bridge member and B' denotes

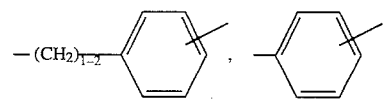

Suitable substituents for the alkyl radicals are in particular Cl, CN, $SO_3H$, $OSO_3H$, COOH and $OC_1$–$C_4$-alkyl.

Very generally, in the context of the dyestuffs mentioned those containing sulpho groups (preferably 1–6 sulpho groups) where X is —$CH_2CH_2OSO_3H$ or —$CH=CH_2$ and z is

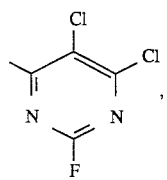

(a)

-continued

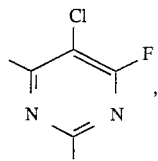

(b)

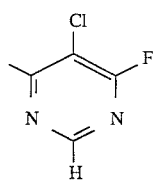

or a mixture of 40–96 mole % of (b) and 60–4 mole % of (a) are preferred.

Aliphatic radicals E and G which are particularly suitable are $C_2$–$C_8$-alkylene radicals, which can be interrupted by heteroatoms or heteroatom groupings or can be substituted, such as, for example,

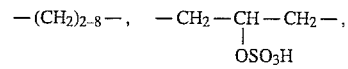

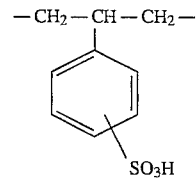

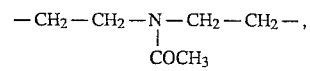

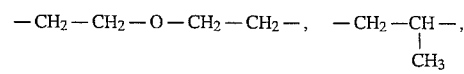

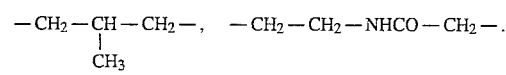

Araliphatic radicals E and G which are particularly suitable are $C_1$–$C_4$-alkylenephenyl radicals, which can be interrupted by heteroatoms or heteroatom groupings, such as for example

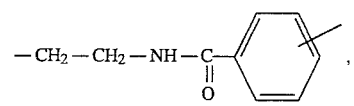

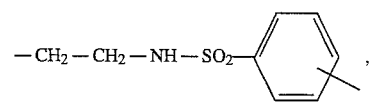

-continued

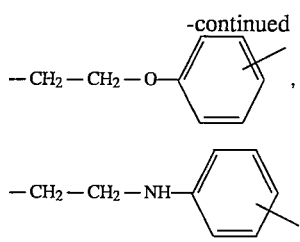

Aromatic radicals E and G which are particularly suitable are phenylene radicals, which can be substituted by substituents such as, for example, SO$_3$H or COOH, such as, for example,

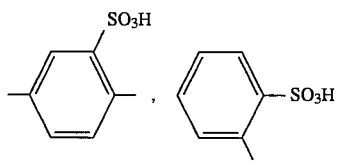

The dyestuffs of the formula (1) can be prepared by various processes customary in dyestuff chemistry. The following may be mentioned:

1) Dyestuffs of the formula

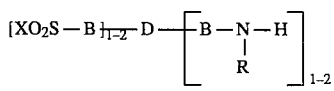 (44)

or their precursors are converted with 1 or 2 moles of a reactive component

Z—W (45)

in which W denotes a substituent such as fluorine or chlorine which can be eliminated as an anion, to the dyestuffs of the formula (1), or the precursors obtained are converted to the desired final dyestuffs, if desired followed by a further conversion reaction.

Thus, the starting compounds are dyestuffs which already contain an X—SO$_2$— group and the group —N(R)H is acylated with a reactive component Z—W; or the corresponding precursors, for example a diazo component of the formula

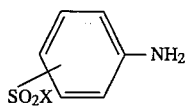

are used and coupled onto a coupling component which contains a group —N(R)H and the group —N(R)H is acylated before or after the coupling reaction with a reactive component Z—W. In the embodiment described above, the acylated group —N(R)H can also be present in the diazo component and accordingly the X—SO$_2$— group in the coupling component. In this case, the diazo components used are in particular 1,3-phenylenediamine-4-sulphonic acid, 1,4-phenylenediamine-2-sulphonic acid, 1,4-phenylenediamine-2,5-disulphonic acid or 1,3-phenylenediamine-4,6-disulphonic acid. If desired, the corresponding acetylamino or nitro compounds in which the acetylamino or nitro group is converted before the condensation with a reactive component Z—W to the H$_2$N— group by hydrolysis or reduction are used. The position of the reactive radicals in the finished azo dyestuff is therefore not invariably tied to specific starting components, diazo or coupling components.

Furthermore, the two reactive radicals can also bound to one and the same component, for example by using a non-fibre-reactive diazo component and a coupling component of the formula

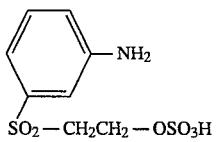

and acylating the —NH$_2$ group after the coupling reaction with a reactive component Z—W.

The variant in which the process is started with dyestuff precursors is suitable for the preparation of reactive dyestuffs of the formula (1) in which D is the radical of a dyestuff composed of two or more than two components. Example of this type of dyestuff composed of two or more than two components are: monoazo, secondary disazo, metal complex azo and formazan dyestuffs. The preparation of the final dyestuffs from precursors is in most cases carried out by coupling reactions resulting in azo dyestuffs. In addition, the synthesis can be followed by elimination reactions. For example, reactive dyestuffs of the formula (1) which contain sulphatoethylsulphonyl radicals can be treated with acid-eliminating agents, such as sodium hydroxide, which convert the sulphatoethylsulphonyl radicals into vinylsulphonyl radicals.

The preparative method described above via an intermediate of the reactive radical leads in many cases to a uniform product and complete conversion.

If groups which are capable of metal complex formation are present in the reactive dyestuffs prepared, the reactive dyestuffs can also be metallized afterwards.

Since the individual abovementioned process steps can be carried out in a different order, different process variants are possible. In general the reaction is carried out in successive steps, in which the order of the simple reactions between the individual reaction components advantageously depends on the particular conditions. Since hydrolysis of the reactive radical Z takes place under certain conditions, an intermediate which contains acetylamino groups has to be hydrolysed, in order to eliminate the acetyl groups, before it is condensed with a reactive component Z—W. Which part of the reaction is best carried out first, varies from case to case and in particular depends on the solubility of the amino compounds involved and the basicity of the amino groups to be acylated.

The acylation of the dyestuffs of the formula (44) or the dyestuff precursors with a reactive component Z—W is carried out by methods known per se, preferably in aqueous solution or suspension and in the presence of alkaline, acid-binding agents, for example aqueous alkali metal hydroxides, alkali metal carbonates or alkali metal bicarbonates.

The most important process variants are described in the exemplary embodiments. The reactive dyestuffs of the formula (1) are in principle prepared in a manner known per se or analogously to known methods by starting with precursors or intermediates for dyestuffs which contain fibre-reactive radicals according to formula (1), or introducing these fibre-reactive radicals in suitable intermediates of dyestuff character.

2. Another advantageous method consists in first preparing a dyestuff which contains a precursor of the reactive radical and converting it afterwards into the final product, for example by esterification or an addition reaction. For example, it is possible to prepare a dyestuff of the formula (1) in which X is a radical HO—CH$_2$CH$_2$— and react the intermediate before or after the acylation with sulphuric acid, thus converting the hydroxyl group into the sulphato group; or an analogous dyestuff in which X is the vinyl group H$_2$C═CH— is used and thiosulphuric acid is added onto the intermediate, forming a radical HO$_3$SS—CH$_2$CH$_2$—. The sulphation of the hydroxyl group in a dyestuff of the formula (1) or a suitable precursor is carried out, for example, by reaction with concentrated sulphuric acid at 0° C. to moderately elevated temperature. The sulphation can also be carried out by reaction of the hydroxy compound with 2 equivalents of chlorosulphonic acid per hydroxyl group in a polar organic solvent, such as, for example, N-methylpyrrolidone, at 10° C.–80° C.

The sulphation is preferably carried out by stirring the compound concerned into sulphuric acid monohydrate at temperatures between 5° C. and 15° C. The introduction of another radical for X which can be eliminated under alkaline conditions into a compound of the formula (1) or an intermediate instead of the sulphato group, for example a thiosulphato group, is carried out in a manner known per se.

Examples of diazo components containing 1 to 2 groups —SO$_2$X are:

4-β-Sulphatoethylsulphonyl-aniline, 4-β-thiosulphatoethylsulphonyl-aniline, 4-vinylsulphonyl-aniline, 4-β-chloroethylsulphonyl-aniline, 3-β-sulphatoethylsulphonyl-aniline, 3-vinylsulphonyl-aniline, 2-methoxy-5-β-sulphatoethylsulphonyl-aniline, 2-methoxy-5-β-thiosulphatoethylsulphonyl-aniline, 2-methoxy-5-vinylsulphonyl-aniline, 4-methoxy-3-β-sulphatoethylsulphonylaniline, 4-methoxy-3-β-vinylsulphonyl-aniline, 2,5-dimethoxy-4-β-sulphatoethylsulphonyl-aniline, 2,5-dimethoxy-4-vinylsulphonyl-aniline, 2,5-dimethoxy-4-β-sulphatoethylsulphonyl-aniline, 2-methoxy-5-methyl-4-β-sulphatoethylsulphonyl-aniline, 2-β-sulphatoethylsulphonyl-aniline, 2-chloro-5-β-sulphatoethylsulphonyl-aniline, 4-chloro-3-β-sulphatoethylsulphonyl-aniline, 3-amino-(3-or 4-aminobenzoyl)aminophenyl β-sulphatoethyl sulphone, 2-methoxy-5-methyl-4-vinylsulphonyl-aniline, 6-carboxy-3-β-sulphatoethylsulphonyl-aniline, 6-carboxy-3-vinyl-sulphonyl-aniline, 2-sulpho-4-β-sulphatoethylsulphonyl-aniline, 2-sulpho-4-vinylsulphonyl-aniline, 2,4-disulpho-5-vinylsulphonyl-aniline, 2-hydroxy-5-β-sulphatoethylsulphonyl-aniline, 2-hydroxy-4-β-sulphatoethylsulphonyl-aniline, 3-sulpho-2-hydroxy-5-β-sulphatoethylsulphonyl-aniline, 8-β-sulphatoethylsulphonyl-2-naphthylamine, 6 -β-sulphatoethylsulphonyl-2-naphthylamine, 1-sulpho-6 -β-sulphatoethylsulphonyl-2-naphthylamine, 4-β-sulphatoethylsulphonyl-1-naphthylamine, 1-sulpho-5-β-sulphatoethylsulphonyl-2-naphthylamine, 6-sulpho-8-β-sulphatoethylsulphonyl-2-naphthylamine, 2-amino-3-sulpho-6,8 -bis(β-sulphatoethylsulphonyl)naphthylamine, 2-bromo-4-β-sulphatoethylsulphonyl-aniline, 2,6-dichloro-4-β-sulphatoethylsulphonyl-aniline, 5-β-sulphatoethylsulphonyl-1-naphthylamine, 5-β-sulphatoethylsulphonyl-2-naphthylamine, 8-β-sulphatoethylsulphonyl-2-naphthylamine, 8 -sulpho-6-β-sulphatoethylsulphonyl-2-naphthylamine, 6 -β-sulphatoethylsulphonyl-1-naphthylamine, 7-β-sulphatoethylsulphonyl-1-naphthylamine.

Further examples are the corresponding β-hydroxy compounds, which can be used as precursors: 4-β-hydroxyethylsulphonyl-aniline, 3-β-hydroxyethylsulphonyl-aniline and 2,4-di-(β-hydroxyethylsulphonyl)-5-chloro-aniline.

Examples of suitable diazo components containing the radical

are

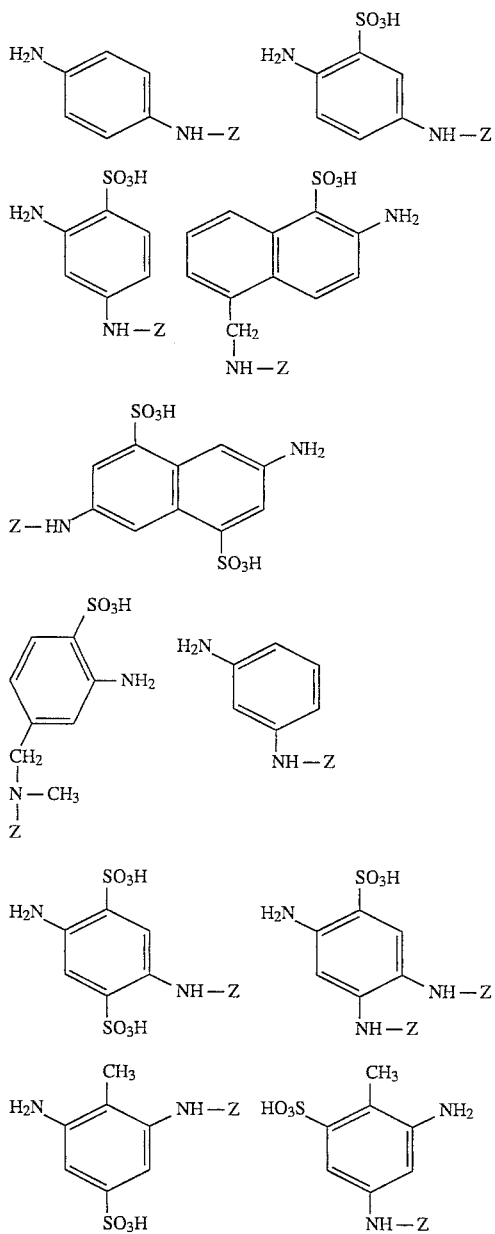

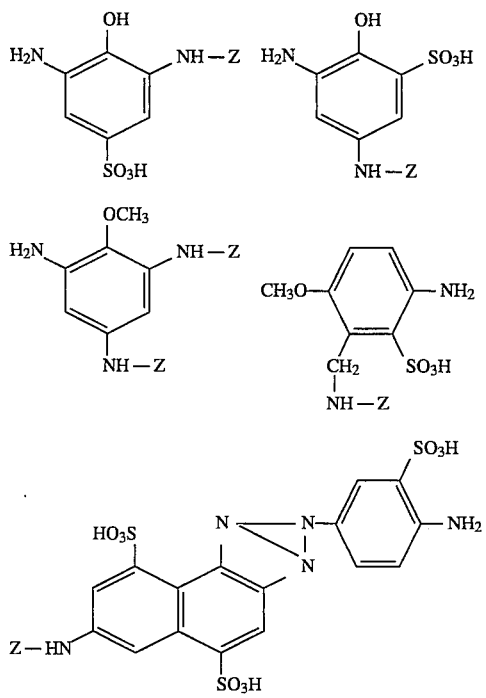
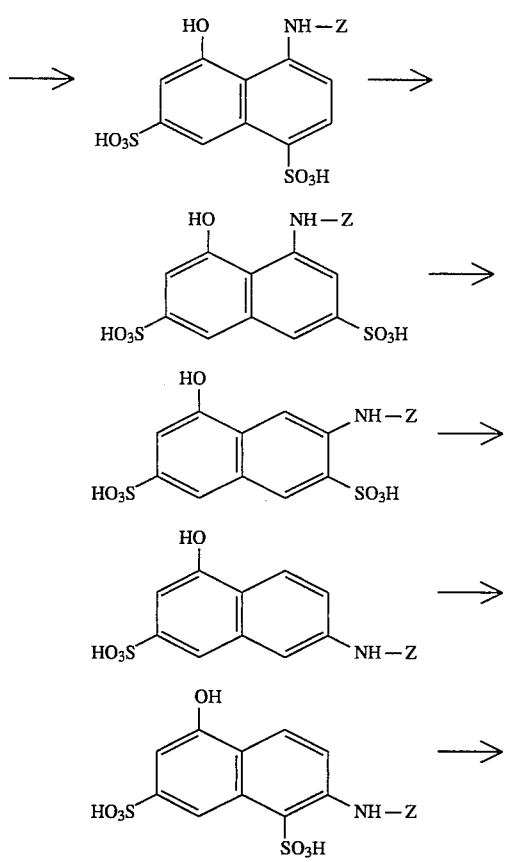
Coupling components which contain the radical Z and can be present in the monoazo or disazo dyestuffs according to the invention or can serve for their preparation are in particular, for example, the compounds of the formulae:
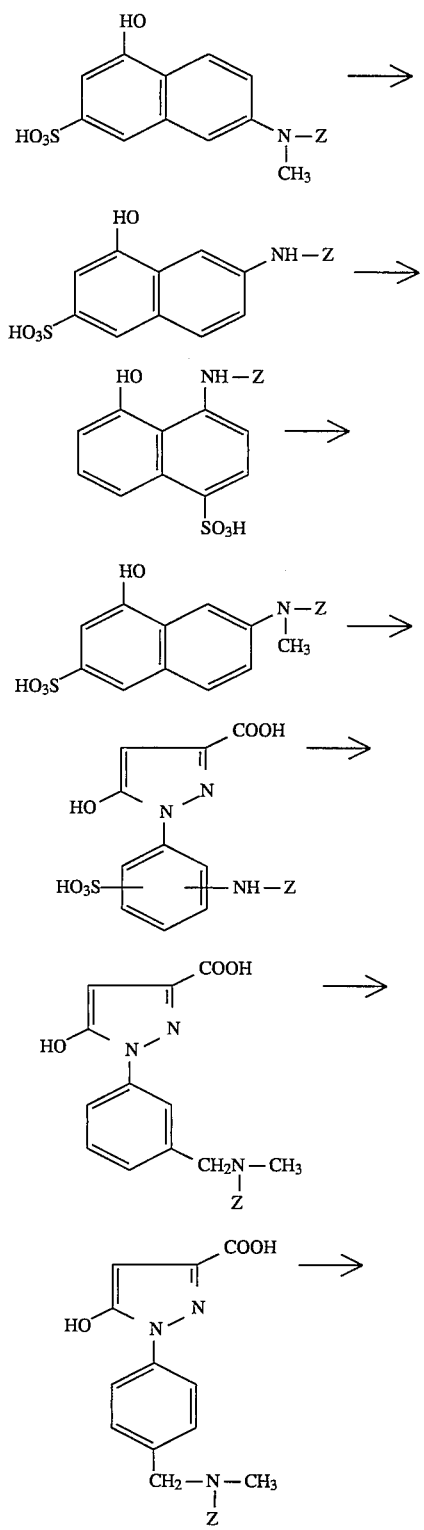

-continued

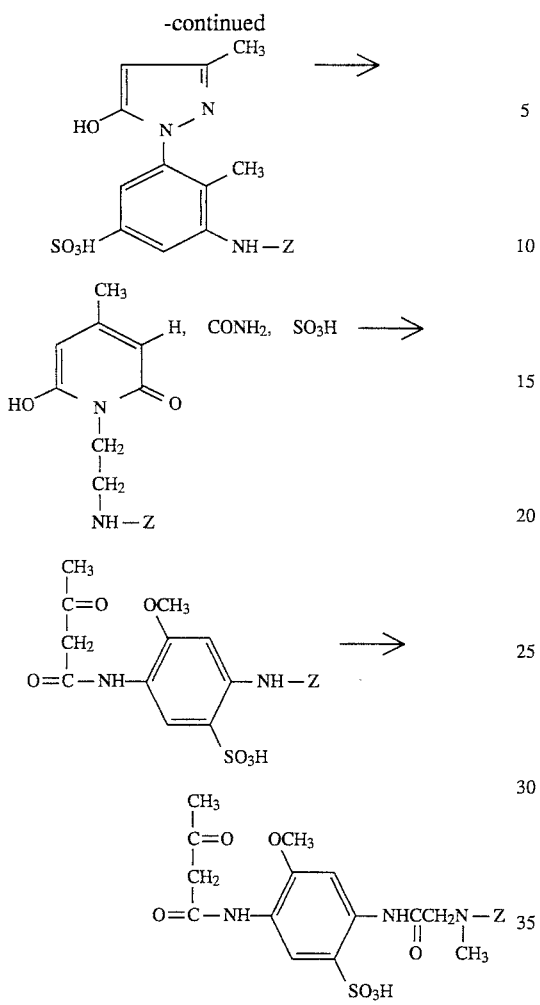

Examples of coupling components containing the radical $SO_2X$ are as follows:

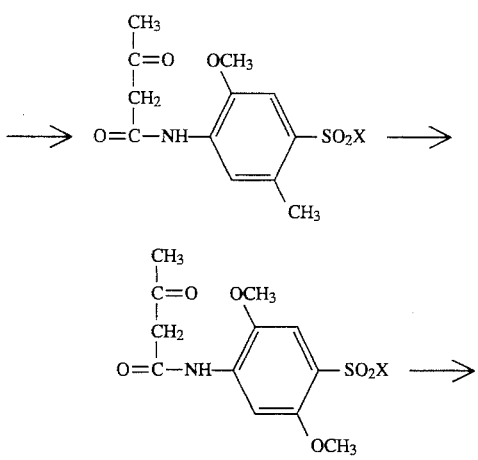

The reactive dyestuffs of the formula (1) can be isolated and processed to give useful dry dyestuff products. They are preferably isolated at the lowest possible temperatures by salting out and filtration. The filtered dyestuffs can be dried, if appropriate after the addition of diluents and/or buffers, for example after the addition of a mixture of equal parts of monosodium phosphate and disodium phosphate; they are preferably dried at moderately high temperatures and under reduced pressure. In some cases, the dry products according to the invention can be prepared directly, that is to say, without isolation of the intermediate dyestuff, by spray drying of the entire preparation mixture.

The reactive dyestuffs of the formula (1) are distinguished by high reactivity and produce dyeings having good wet and light fastness properties. It should be mentioned in particular that the dyestuffs have good solubility and electrolyte solubility in combination with good exhaustion properties and high dyestuff fixation and that the unfixed portions can easily be removed.

The reactive dyestuffs of the formula (1) are suitable for the dyeing and printing of various substrates which contain, for example, hydroxyl groups or amido groups, such as silk, leather, wool, superpolyamide fibres and superpolyamide urethanes, but in particular cellulose-containing materials of fibre-like structure, such as linen, cellulose, regenerated cellulose and in particular cotton. They are suitable not only for the exhaust process but also for dyeing by the pad-dyeing method, in which the material is impregnated with aqueous, and if necessary, also salt-containing dyestuff solutions and the dyestuffs are fixed after an alkali treatment or in the presence of alkali, if appropriate under the influence of heat.

They are also suitable for prints, in particular on cotton, but also for the printing of nitrogen-containing fibres, for example wool, silk or wool-containing mixed fabric.

It is advisable to subject the dyeings and prints to thorough rinsing with cold and hot water, if appropriate with the addition of an agent which acts as a dispersant and promotes the diffusion of the unfixed portions.

The formulae given are those of the free acids. The preparation generally produces the salts, in particular the alkali metal salts, such as sodium salts, potassium salts or lithium salts. However, it is also possible to use the dyestuffs in the form of concentrated solution.

The temperatures in the examples are given in °C.

The colour numbers given in the examples refer to the Colour Index Hue Indication chart (indicator numbers).

Further useful dyestuffs which dye cotton in the hues mentioned in column 5 are obtained by the procedure of Example 1, by diazotizing the amines listed in column 2 and coupling the product onto the condensation product which is obtained by acylation of the coupling components mentioned in column 3 with the reactive components mentioned in column 4.

In the examples, the mixtures A, B and C denote the following mixtures (given in % by weight)

| Mixture | 2,4-Difluoro-5,6-dichloropyrimidine | 4,6-Difluoro-2,5-dichloropyrimidine |
| --- | --- | --- |
| A | 40 | 60 |
| B | 35 | 65 |
| C | 30 | 70 |

EXAMPLE 1

0.1 mol of 1-amino-8-hydroxynaphthalene-3,6-disulphonic acid (H acid) are dissolved in 150 ml of water at pH 10. The mixture is cooled to 10° C., and 18.5 g of a mixture of 65% of 4,6-difluoro-2,5-dichloropyrimidine and 35% of 2,4-difluoro-5,6-dichloropyrimidine are added dropwise over a period of 30 minutes, during which the pH is kept at pH 10 by the addition of 10% strength sodium hydroxide solution. The mixture is stirred at pH 10 for 30 minutes and then checked for unconverted H acid. It may be necessary to add another 0.5 to 1 g of the mixture of the reactive components. The pH is then adjusted to 7 with dilute hydrochloric acid.

0.1 mol of 2-amino-6-β-sulphatoethylsulphonyl-naphthalene-1-sulphonic acid are stirred in 300 ml of ice water, 20 ml of concentrated hydrochloric acid are added, and an aqueous solution of 7 g of sodium nitrite is added dropwise. Excess sodium nitrite is removed by means of sulphamic acid, the diazonium salt solution is added to the solution of the coupling component, and the pH is kept between 6 and 7 by adding sodiumbicarbonate powder.

After the coupling reaction is finished, the dyestuff is salted out, isolated, dried and ground. The dyestuff thus obtained of the formula

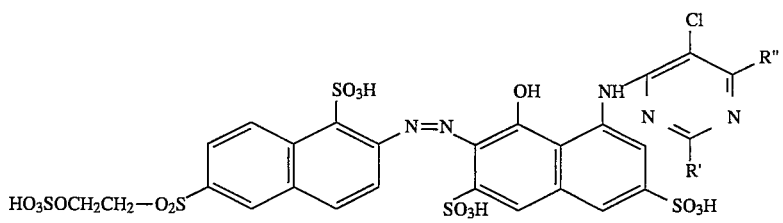

65% of R'=Cl, R"=F

35% of R'=F, R"=Cl dyes cotton in bluish red hues (colour number 9).

| Ex. | Amine | Coupling component | Reactive component | Hue | Colour number |
|---|---|---|---|---|---|
| 2 | 4-β-Sulphatoethyl-sulphonyl-aniline | H acid | Mixture B | red | 8 |
| 3 | 4-β-Sulphatoethyl-sulphonyl-aniline | " | Mixture C | | |
| 4 | 8-β-Sulphatoethyl-sulphonyl-2-amino-6-sulpho-naphthalene | " | " | bluish red | 9 |
| 5 | 3-β-Sulphatoethyl-sulphonyl-aniline | " | " | red | 8 |
| 6 | 4-(3'-β-Sulphatoethyl-sulphonyl-phenylamino)-carbonyl-aniline | " | " | red | 8 |
| 7 | 2-Methoxy-5-β-sulphato-ethyl-sulphonyl-aniline | " | " | red violet | 10 |
| 8 | 2-Sulpho-4-β-sulphato-ethylsulphonyl-aniline | " | " | yellowish red | 7 |
| 9 | 4-β-Sulphatoethyl-sulphonyl-aniline | 1-Amino-8-hydroxy-naphthalene-4,6-di-sulphonic acid (K acid) | " | red | 7 |
| 10 | 6-β-Sulphatoethyl-sulphonyl-2-amino-1-sulpho-naphthalene | 1-Amino-8-hydroxy-naphthalene-4,6-di-sulphonic acid (K acid) | " | red | 8 |
| 11 | 3-β-Sulphatoethyl-sulphonyl-aniline | 1-Amino-8-hydroxy-naphthalene-4,6-di-sulphonic acid (K acid) | " | red | 7 |
| 12 | 2-Methoxy-5-β-sulphato-ethylsulphonyl-aniline | 1-Amino-8-hydroxy-naphthalin-4,6-di-sulphonic acid (K acid) | Mixture C | bluish red | 9 |
| 13 | 8-β-Sulphatoethyl-sulphonyl-2-amino-6-sulpho-naphthalene | 1-Amino-8-hydroxy-naphthalin-4,6-di-sulphonic acid (K acid) | " | red | 9 |
| 14 | 4-β-Sulphatoethyl-sulphonyl-aniline | H acid | 2,4-Difluoro-5-chloro-pyrimidine | red | 8 |
| 15 | " | " | 4,6-Difluoro-5-chloro-pyrimidine | red | 8 |
| 16 | 6-β-Sulphatoethyl-sulphonyl-2-amino-1-sulpho-naphthalene | " | 4,6-Difluoro-5-chloro-pyrimidine | bluish red | 9 |
| 17 | " | " | 2,4-Difluoro-5-chloro-pyrimidine | bluish red | 9 |
| 18 | " | K acid | " | red | 8 |
| 19 | 4-β-Sulphatoethyl-sulphonyl-aniline | " | 4,6-Difluoro-5-chloro-pyrimidine | red | 7 |
| 20 | 3-β-Sulphatoethyl-sulphonyl-aniline | H acid | 4,6-Difluoro-5-chloro-pyrimidine | red | 8 |
| 21 | 4-β-Thiosulphatoethyl-sulphonyl-aniline | " | 4,6-Difluoro-5-chloro-pyrimidine | red | 8 |
| 22 | 3-β-Thiosulphato-ethyl-sulphonyl-aniline | H acid | 4,6-Difluoro-5-chloro-pyrimidine | red | 8 |
| 23 | 2-Sulpho-4-β-sulphato-ethyl-sulphonyl-aniline | 1-(4-Aminobenzoyl-amino)-8-hydroxy-naphthalene-3,6-di-sulfonic acid | 4,6-Difluoro-5-chloro-pyrimidine | yellowish red | 7 |
| 24 | 4-β-Chloroethyl-sulphonyl-anilin | H acid | 4,6-Difluoro-5-chloro-pyrimidine | red | 8 |
| 25 | 4-β-Acetoxyethyl-sulphonyl-aniline | " | 4,6-Difluoro-5-chloro-pyrimidine | red | 8 |
| 26 | 2-Sulpho-4-β-sulphato-ethyl-sulphonyl-aniline | " | 4,6-Difluoro-5-chloro-pyrimidine | yellowish red | 7 |
| 27 | 3-β-Thiosulphato-ethyl-sulphonyl-aniline | K acid | 4,6-Difluoro-5-chloro-pyrimidine | red | 7 |
| 28 | 4-Vinylsulphonyl-aniline | " | 4,6-Difluoro-5-chloro-pyrimidine | red | 7 |

EXAMPLE 29

0.1 mol of H acid are adjusted in 400 ml of ice water to a pH of 5 with dilute sodium hydroxide solution. 14 g of cyanuric fluoride are added dropwise, causing the pH to drop. It is maintained at a pH of 3 to 4 by adding sodium bicarbonate powder. Stirring at pH 3 to 4 and 0° is continued for 15 minutes. A neutral solution of the sodium salt of 0.1 mol of a mixture of 65% of 4-fluoro-2,5-dichloro-6-(3'-amino-4'-sulphophenylamino)pyrimidine and 35% of 2-fluoro-5,6-dichloro-4-(3'-amino-4'-sulphophenylamino)pyrimidine (this mixture can be prepared according to the details given in Example 1 of European Application 168, 703) is then added. At a pH from 5 to 5.5, the mixture is stirred at 20°–25° C. for 5 hours, until no more free amine can be detected by diazotization of a sample. The solution is used as coupling component for the preparation of the dyestuff.

0.1 mol of 4-β-sulphatoethylsulphonyl-aniline are stirred in 250 ml of ice water, 20 ml of conc. hydrochloric acid are added, and a solution of 7 g of sodium nitrite in 50 ml of water is then added dropwise. Stirring at 5° C. is continued for ½ hour and the excess nitrite is destroyed with sulphamic acid. The suspension of the diazo compound thus obtained is slowly run into the solution of the coupling component at a pH from 6 to 7. The mixture is stirred for 2 hours until the coupling reaction is complete. The dyestuff is salted out at a pH of 6.5, filtered off with suction and dried. It is ground to give a red dyestuff powder which dyes cotton in a clear red (colour number 8). The dyestuff conforms to the formula

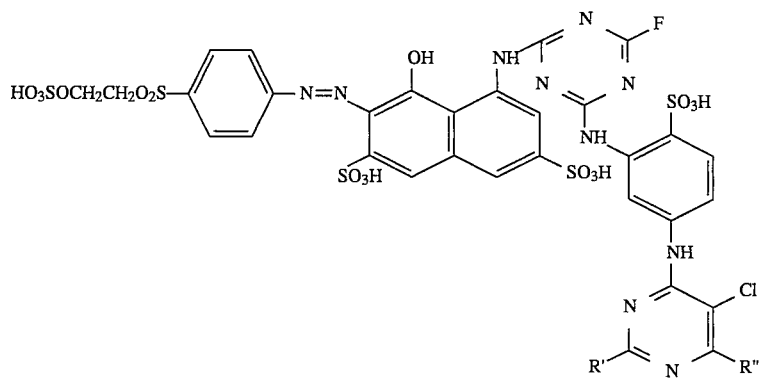

65% of R'=Cl, R"=F
35% of R'=F, R"=Cl

Further useful dyestuffs are obtained by following the procedure of this example and using the diazo components listed in column 2 and cyanuric chloride instead of cyanuric fluoride, the conditions used for the condensation with cyanuric chloride being those known from the literature.

| Ex. | Diazo component | Reactive component | Hue | Colour number |
|---|---|---|---|---|
| 30 | 3-β-Sulphatoethyl-sulphonyl-aniline | Cyanuric chloride | red | 8 |
| 31 | 3-β-Sulphatoethyl-sulphonyl-aniline | " | red | 8 |
| 32 | 6-β-Sulphatoethyl-sulphonyl-8-sulpho-2-amino-naphthalene | " | bluish red | 9 |
| 33 | 6-β-Sulphatoethyl-sulphonyl-8-sulpho-2-amino-naphthalene | Cyanuric fluoride | " | 9 |
| 34 | 3-β-Sulphatoethyl-sulphonyl-aniline | " | red | 8 |
| 35 | 5-β-Sulphatoethyl-sulphonyl-2-methoxy-aniline | " | reddish violet | 10 |

Analogously to the method described in Example 29, the dyestuffs which are listed in the table below and which dye cotton in the hue given can be prepared by using the corresponding intermediates.

| Ex. | Dyestuff | Hue | Colour number |
|---|---|---|---|
| 36 | | red | 8 |
| 37 | | red | 7 |
| 38 | | red | 8 |

-continued

| Ex. | Dyestuff | Hue | Colour number |
|---|---|---|---|
| 39 | | bluish red | |
| 40 | | red | |
| 41 | | red | |

EXAMPLE 42

281 parts of 4-β-sulphatoethylsulphonyl-aniline are stirred into 1000 parts of water and dissolved by careful addition of 65 parts of sodium carbonate, in the course of which the pH is adjusted to 6.5 to 7.0. Stirring at this pH is continued for 2 hours, 750 parts of ice and 255 parts of a 31% strength aqueous hydrochloric acid solution are then added; 173 parts of 40% strength aqueous sodium nitrite solution are then run in, stirring is continued at 0° to 5° C. for another 2 hours, and excess nitrous acid is then destroyed by means of sulphamic acid. At a pH of 6.0 to 6.5, the solution of the condensation product from 1 mol each of cyanuric chloride, 1-amino-8-naphthol-3,6-disulphonic acid, 3-aminoacetanilide-4-sulphonic acid and 5-chloro-4,6-difluoropyrimidine is run into the diazonium salt suspension thus prepared, while simultaneously stirring in about 70 parts of sodium carbonate. This solution of the condensation product is prepared as follows: 319 parts of 1-amino-8-naphthol-3,6-disulphonic acid are stirred into a mixture of 500 parts of water and 121 parts of a 33% strength sodium hydroxide solution; the pH of the solution should subsequently be 6.5 to 7.0. This solution is run into a suspension of 194 parts of cyanuric chloride, 800 parts of water and 800 parts of ice at a pH of 3.0 to 3.8 over a period of 1 hour. Stirring at 0° to 5° C. and at the pH mentioned, which is maintained by adding 92 parts of sodium bicarbonate powder, is continued for another hour. 221 parts of 3-aminoacetanilide-4-sulphonic acid and then 105 parts of sodium carbonate are stirred over a period of one hour into the clear solution thus obtained, causing the pH to increase to 4.5 to 5.0. At this pH, stirring is continued for 2 hours, during which the temperature is maintained at 35° to 40° C. 400 parts of conc. sodium hydroxide are added to the solution, and the mixture is stirred at 70° to 75° C. for 2 hours. It is then neutralized with conc. hydrochloric acid. An equivalent amount of 5-chloro-4,6-difluoropyrimidine is then added to this neutral solution, and the mixture is warmed to 30° C.

This gives a red electrolyte-containing powder which contains the dyestuff of the formula of fixation. The dyeings have very good wet fastness properties.

EXAMPLE 43

0.1 mol of 2-amino-5-hydroxynaphthalene-7-sulphonic acid (I acid) are dissolved in 400 ml of water with the addition of conc. sodium hydroxide at a pH of 6 to 6.5. The mixture is then cooled to 10° and 18.5 g of the difluorodichloropyrimidine mixture B are added dropwise, the pH being maintained at 6 during the dropwise addition by means of dilute sodium hydroxide solution. Stirring at pH 6 and 15° C. is continued until the test for the amino group is negative. It may be necessary to add another 1–2 g of the mixture of the reactive component. The solution is used as coupling component for the preparation of the dyestuff.

0.1 mol of 2-amino-6-β-sulphatoethylsulphonylnaphthalene-2-sulphonic acid are diazotized by the procedure of Example 1. The diazonium salt solution thus obtained is added dropwise at a pH of 5-6 over a period of 2 hours to the coupling solution. Stirring at pH 5.5–6 is continued for two hours, until the coupling reaction is completed. The dyestuff is then salted out, isolated, and dried. It is ground to give a red dyestuff powder which is readily soluble in water with the formation of an orange colour. The dyestuff of the formula

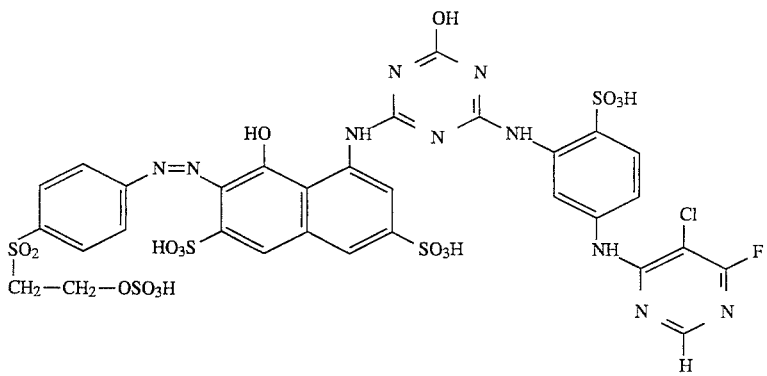

This dyestuff dyes wool from an acid bath or cellulose fibre materials in the presence of acid-binding agents by the application and fixation methods customary for fibre-reactive dyestuffs in industry in clear red shades (colour number 8) which have very good colour build up and a high degree

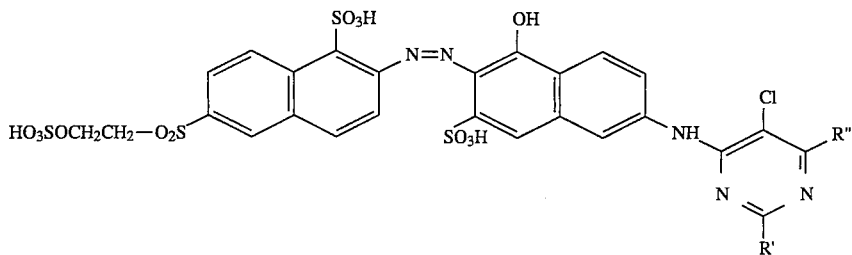

65% of R'=Cl, R"=F
35% of R'=F, R"=Cl dyes cotton by a dyeing process customary for reactive dyestuffs in clear reddish orange shades (colour number 6).

Further useful dyestuffs which dye cotton in the hues mentioned in column 5 are obtained by the procedure of Example 43, by diazotizing the amines listed in column 2 and coupling the product onto the condensation product which is obtained by acylation of the coupling components mentioned in column 3 with the reactive components mentioned in column 4.

| Ex. | Diazo component | Reactive component | Hue | Colour | number |
|---|---|---|---|---|---|
| 44 | 2-Amino-6-sulphato-ethyl-sulphonyl-naphthalene-1-sulphonic acid | I acid | 2,4-Difluoro-5,6-dichloropyrimidine | reddish orange | 6 |
| 45 | 2-Amino-6-sulphato-ethyl-sulphonyl-naphthalene-1-sulphonic acid | " | 2,4-Difluoro-5-chloropyrimidine | reddish orange | 6 |
| 46 | 2-Amino-6-sulphato-ethyl-sulphonyl-naphthalene-1-sulphonic acid | 2-Amino-8-hydroxy-naphthalin-6-sulphonic acid (γ acid) | Mixture B | yellowish | 7 |
| 47 | 2-Amino-6-sulphato-ethyl-sulphonyl-naphthalene-1-sulphonic acid | 2-Amino-8-hydroxy-naphthalin-6-sulphonic acid (γ acid) | Mixture A | " | 7 |
| 48 | 2-Amino-6-sulphato-ethyl-sulphonyl-naphthalene-1-sulphonic acid | 2-Amino-8-hydroxy-naphthalin-6-sulphonic acid (γ acid) | Mixture C | " | 7 |
| 49 | 2-Amino-6-sulphato-ethyl-sulphonyl-naphthalene-1-sulphonic acid | I acid | Mixture A | reddish orange | 6 |
| 50 | 2-Amino-6-sulphato-ethyl-sulphonyl-naphthalene-1-sulphonic acid | " | Mixture C | reddish orange | 6 |
| 51 | 4-β-Sulphatoethyl-sulphonyl-aniline | " | Mixture B | orange | 5 |
| 52 | 4-β-Sulphatoethyl-sulphonyl-aniline | " | Mixture C | " | 5 |
| 53 | 4-β-Sulphatoethyl-sulphonyl-aniline | γ acid | Mixture B | yellowish red | 7 |
| 54 | 4-β-Sulphatoethyl-sulphonyl-aniline | " | Mixture C | yellowish red | 7 |
| 55 | 4-β-Sulphatoethyl-sulphonyl-2-sulpho-aniline | γ acid | Mixture C | reddish orange | 6 |
| 56 | 4-β-Sulphatoethyl-sulphonyl-2-sulpho-aniline | " | Mixture B | reddish orange | 6 |
| 57 | 4-β-Sulphatoethyl-sulphonyl-2-sulpho-aniline | I acid | Mixture B | orange | 5 |
| 58 | 4-β-Sulphatoethyl-sulphonyl-2-sulpho-aniline | " | Mixture C | orange | 5 |
| 59 | 8-β-Sulphatoethyl-sulphonyl-6-sulpho-2-amino-naphthalene | " | Mixture B | reddish orange | 6 |
| 60 | 4-β-Sulphatoethyl-sulphonyl-aniline | 7-Amino-1-hydroxy-napthalene-3,6-di-sulfonic acid | 4,6-difluoro-4-chloropyrimidine | yellowish red | 7 |
| 61 | 4-β-Sulphatoethyl-sulphonyl-aniline | 7-(β-Sulphatoethylamino)-1-hydroxynaphthalene 3-Sulphonic acid | " | yellowish red | 7 |
| 62 | 2-Amino-6-β-sulphato-ethylsulphonyl-naphthalene 1-sulphonic acid | 7-(β-Sulphatoethylamino)-1-hydroxynaphthalene 3-Sulphonic acid | " | yellowish red | 7 |
| 63 | 2-Amino-6-β-sulphato-ethylsulphonyl-naphthalene | 6-(β-Sulphatoethylamino)-1-hydroxynaphthalene- | " | reddish orange | 6 |

| Ex. | Diazo component | Reactive component | Hue | number | Colour |
|---|---|---|---|---|---|
| 64 | 1-sulphonic acid 4-β-Sulphatoethyl-sulphonylaniline | 3-sulphonic acid 6-(β-Sulphatoethyl-amino)-1-hydroxy-naphthalene-3-sulphonic acid | 4,6-Difluoro-5-chloropyrimidine | orange | 5 |
| 65 | 4-β-Sulphatoethyl-sulphonylaniline | I acid | 4,6-Difluoro-5-chloropyrimidine | orange | 5 |
| 66 | 4-β-Sulphatoethyl-sulphonyl-2-sulphoaniline | " | 4,6-Difluoro-5-chloropyrimidine | orange | 5 |
| 67 | 4-β-Sulphatoethyl-sulphonyl-2-sulphoaniline | Y acid | 4,6-Difluoro-5-chloropyrimidine | reddish orange | 6 |
| 68 | 4-β-Sulphatoethylsulphonyl-aniline | " | 4,6-Difluoro-5-chloropyrimidine | yellowish red | 7 |
| 69 | 4-β-Sulphatoethylsulphonyl-aniline | 6-Amino-1-hydroxy-naphthalene-3,5-di-sulphonic acid | 4,6-Difluoro-5-chloropyrimidine | orange | 5 |

EXAMPLE 70

0.1 mol of 1-aminoethyl-3-sulphomethyl-4-methyl-6-hydroxy-2-pyridone are dissolved in water and reacted with 0.105 mol of 5-chloro-4,6-difluoropyrimidine. The pH is kept at 7.5 with sodium carbonate solution. After the condensation reaction is completed, the diazonium salt solution prepared in Example 1 is added. Neutralization with sodium carbonate solution to a pH of 5 to 6 leads to the coupling reaction. The dyestuff is salted out, filtered off with suction, dried, and ground. This gives a yellow dyestuff powder which is readily soluble in water. Very greenish yellow dyeings are obtained with this dyestuff on cotton by an application process customary for reactive dyestuffs.

The dyestuff conforms to the formula

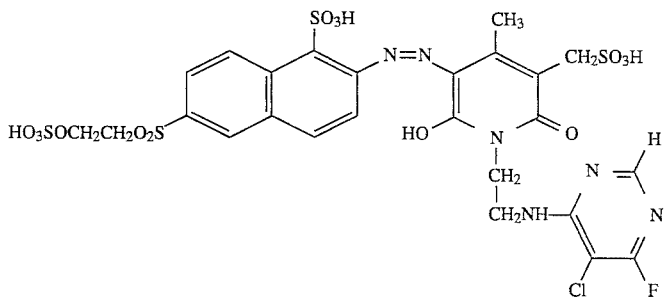

EXAMPLE 71

An equally useful dyestuff is obtained by following the procedure of Example 70 and using the diazonium salt solution from Example 29.

The dyestuff conforms to the formula

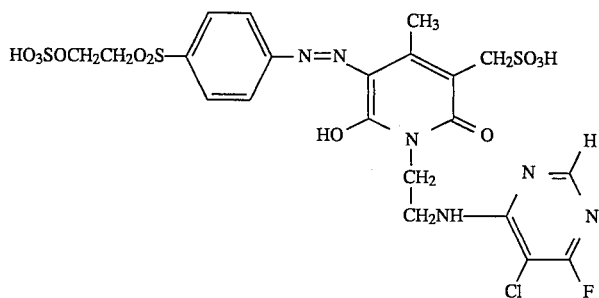

EXAMPLE 72

0.1 mol of 4-acetylamino-2-aminobenzenesulphonic acid are dissolved in 100 ml of water by means of sodium hydroxide solution under neutral conditions, sulphuric acid is added, and the mixture is diazotized at 0° C. with sodium nitrite solution. After one hour, excess nitrite is removed by means of sulphamic acid. An equivalent amount of 1-(4'-hydroxyethylsulphophenyl)pyrazol-5-one-3-carboxylic acid is added to this diazonium salt solution, and the pH is increased to 5 with sodium hydroxide solution. After the coupling reaction is completed, the mixture is heated, sulphuric acid is added, and the acetyl group is hydrolysed at 90° C. The dyestuff precipitates, is filtered off with suction, and dried. The hydroxyl group is subsequently sulphated by pouring the mixture into /sulphuric acid monohydrate. After pouring into ice water, the product is condensed at pH 4 and 40° C. with 5-chloro-4,6-difluoropyrimidine. The dyestuff is salted out, isolated, dried, and ground. This gives a brownish dyestuff powder which contains the dyestuff of the formula

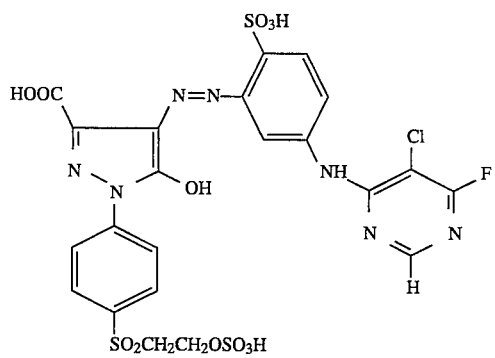

and dyes cotton in greenish yellow hues by the application methods customary for reactive dyestuffs.

EXAMPLE 73

The procedure analogously to Example 72 is repeated, except that 5-acetylamino-2-aminobenzenesulphonic acid is used instead of 4-acetylamino-2-aminobenzenesulphonic acid, to give the dyestuff of the formula

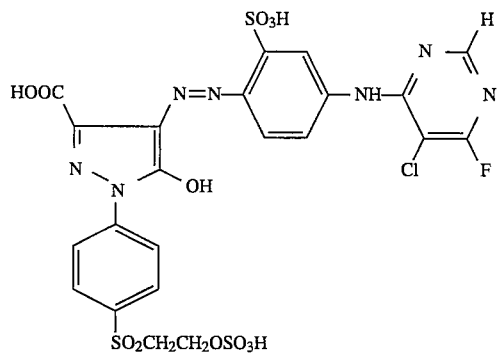

which dyes cotton in golden-yellow hues by the application methods customary for reactive dyestuffs.

Analogously to the methods described, the dyestuffs listed in the table below, which dye cotton in the hues mentioned, can also be prepared.

| Example | Dyestuff | Hue |
|---|---|---|
| 74 | 3-methyl-1-(3-(2-sulfatoethylsulfonyl)phenyl)-5-hydroxy-4-[(2-sulfo-5-(2-chloro-3-fluoro-pyrimidin-4-ylamino)phenyl)azo]pyrazole | greenish yellow |
| 75 | 3-carboxy-1-(3-(2-sulfatoethylsulfonyl)phenyl)-5-hydroxy-4-[(2-sulfo-5-(2-chloro-3-fluoro-pyrimidin-4-ylamino)phenyl)azo]pyrazole | greenish yellow |
| 76 | 3-methyl-1-(3-(2-sulfatoethylsulfonyl)phenyl)-5-hydroxy-4-[(2-sulfo-4-(2-chloro-3-fluoro-pyrimidin-4-ylamino)phenyl)azo]pyrazole | golden-yellow |
| 77 | 3-carboxy-1-(3-(2-sulfatoethylsulfonyl)phenyl)-5-hydroxy-4-[(2-sulfo-4-(2-chloro-3-fluoro-pyrimidin-4-ylamino)phenyl)azo]pyrazole | golden-yellow |
| 78 | 3-methyl-1-(4-(2-sulfatoethylsulfonyl)phenyl)-5-hydroxy-4-[(2-sulfo-5-(2-chloro-3-fluoro-pyrimidin-4-ylamino)phenyl)azo]pyrazole | greenish yellow |

-continued

| Example | Dyestuff | Hue |
|---------|----------|-----|
| 79 | (structure shown) | golden-yellow |

EXAMPLE 80

0.1 mol of 1-(4'-amino-3'-sulphophenyl)-3-methyl-5-pyrazolone are dissolved in 400 ml of water by means of sodium hydroxide solution under neutral conditions, the mixture is adjusted to a pH of 4 with hydrochloric acid and acylated with the equivalent amount of 5-chloro-4,6-difluoropyrimidine at 35° C., and the hydrofluoric acid which is formed is neutralized with sodium carbonate solution. A diazonium salt solution of 2-amino-6-sulphatoethylsulphonyl-naphthalene-1-sulphonic acid prepared as in Example 1 is added to the coupling component thus prepared, and the pH is maintained at 4 with sodium acetate solution. After the coupling reaction is completed, the dyestuff is salted out, isolated, dried and ground. This gives a brownish powder which contains a dyestuff of the formula

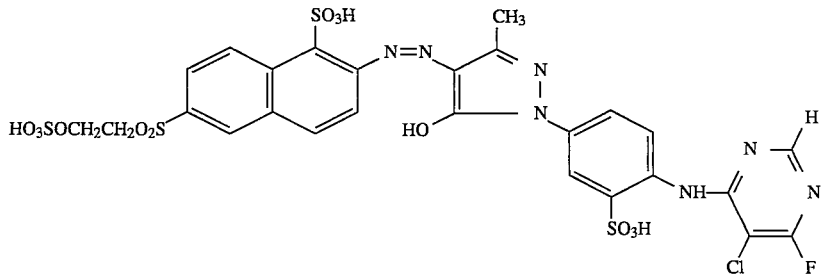

and dyes cotton in yellow hues.

EXAMPLE 81

If in Example 80 the diazonium salt solution of 1-amino-4-sulphatoethylsulphonyl-benzene is used instead of the diazonium salt solution of 2-amino-6-sulphatoethylsulphonyl-naphthalene-1-sulphonic acid, a useful dyestuff of the formula

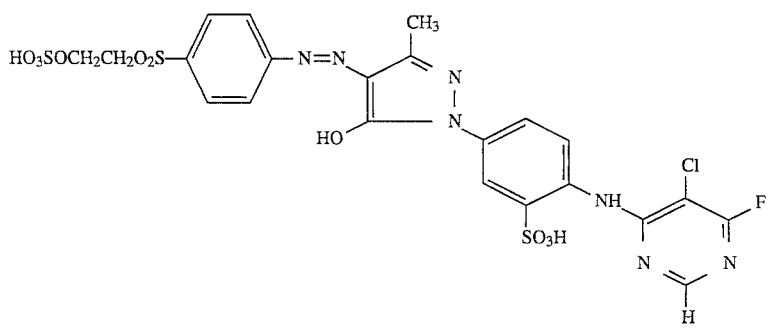

which dyes cotton in yellow hues by application processes customary for reactive dyestuffs is also obtained.

EXAMPLE 82

0.1 mol of 3,6-disulpho-8-β-sulphatoethylsulphonyl-2-aminonaphthalene are stirred in 250 ml of ice water, 20 ml of concentrated hydrochloric acid are added, and a solution of 7 g of sodium nitrite in 50 ml of water is then added dropwise. Stirring at 0° C.–5° C. is continued for 1 hour, and excess nitrite is removed by means of sulphamic acid. 0.1 mol of m-toluidine is then added dropwise to the diazonium salt solution, the pH is adjusted to 3–4 by the addition of sodium bicarbonate powder, and the coupling reaction is completed at 0°–5° C. and pH 3–4. The pH is then adjusted to 6, and 0.1 mol of the mixture B of the reactive components is added dropwise at 50° C.–20° C. Stirring at pH 6–6.5 and 20° C.–25° C. is continued until the acylation is completed. The dyestuff is then salted out, filtered off with suction and dried. It is ground to give a yellow dyestuff powder, which dyes cotton in reddish yellow hues (colour number 3).

The dyestuff conforms to the formula

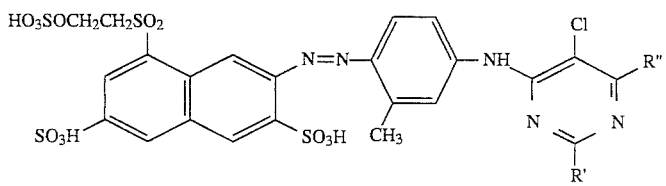

65% of R'=Cl, R"=F

35 % of R'=F, R"=Cl

Further useful dyestuffs are obtained by the procedure of this example by using the diazo components mentioned in column 2, the coupling components listed in column 3, and the reactive components mentioned in column 4, the hues of the dyeings on cotton and the corresponding colour numbers obtained being those listed in column 5.

| Ex. | Diazo Component | Coupling Component | Reactive Component | Hue | Colour Number |
|---|---|---|---|---|---|
| 83 | 3,6-Disulpho-8-β-sulphato-ethylsulphonyl-2-amino-naphthalene | m-Toluidine | Mixture A | reddish-tinged yellow | 3 |
| 84 | 3,6-Disulpho-8-β-sulphato-ethylsulphonyl-2-amino-naphthalene | Mixture B | reddish-tinged | 3 yellow | |
| 85 | 3,6-Disulpho-8-β-sulphato-ethylsulphonyl-2-amino-naphthalene | m-Aminoacetanilide | Mixture A | reddish-tinged yellow | 3 |
| 86 | 3,6-Disulpho-8-β-sulphato-ethylsulphonyl-2-amino-naphthalene | " | Mixture B | reddish-tinged yellow | 3 |
| 87 | 3,6-Disulpho-8-β-sulphato-ethylsulphonyl-2-amino-naphthalene | " | Mixture C | reddish-tinged yellow | 3 |
| 88 | 3,6-Disulpho-8-β-sulphato-ethylsulphonyl-2-amino-naphthalene | m-Aminophenylurea | Mixture A | reddish-tinged yellow | 3 |
| 89 | 3,6-Disulpho-8-β-sulphato-ethylsulphonyl-2-amino-naphthalene | " | Mixture B | reddish-tinged yellow | 3 |
| 90 | 3,6-Disulpho-8-β-sulphato-ethylsulphonyl-2-amino-naphthalene | " | Mixture C | reddish-tinged yellow | 3 |
| 91 | 6-β-Sulphatoethyl-sulpho-nyl-8-sulpho-2-amino-naphthalene | m-Toluidine | Mixture B | reddish-tinged yellow | 3 |
| 92 | 6-β-Sulphatoethyl-sulpho-nyl-8-sulpho-2-amino-naphthalene | m-Aminophenylurea | Mixture B | reddish-tinged yellow | 3 |
| 93 | 6-β-Sulphatoethyl-sulpho-nyl-8-sulpho-2-amino-naphthalene | m-Aminoacetanilide | Mixture B | reddish-tinged yellow | 3 |
| 94 | 2-Sulpho-4-β-sulphato-ethylsulphonyl-aniline | m-Toluidine | Mixture B | yellow | 3 |
| 95 | 2-Sulpho-4-β-sulphato-ethylsulphonyl-aniline | m-Aminoacetanilide | Mixture B | " | 3 |
| 96 | 2-Sulpho-4-β-sulphato-ethylsulphonyl-aniline | m-Aminophenylurea | Mixture B | " | 3 |
| 97 | 6-β-Sulphatoethyl-sulpho-nyl-8-sulpho-2-amino naphthalene | m-Sulfoacetylamino-aniline | Mixture B | " | 3 |
| 98 | 6-β-Sulphatoethyl-sulpho-nyl-8-sulpho-2-amino naphthalene | m-Sulphatoacetylami-aniline | Mixture B no-aniline | " | 3 |
| 99 | 2-Amino-6-β-sulphato-ethylsulphonyl-naphthalene-1-sulphonic acid | 2-Amino-4-acetyl-aminobenzolsulphonic acid | 4,6-Difluor-5-chlor-pyrimidine | " | 3 |
| 100 | 4-β-Sulphatoethylsulphonyl-aniline | 2-Amino-4-acetyl-aminobenzolsulphonic acid | 4,6-Difluor-5-chlor-pyrimidine | " | 3 |
| 101 | 4-β-Sulphatoethylsulphonyl-aniline | 1-Amino-naphthalene-6-sulphonic acid | 4,6-Difluor-5-chlor-pyrimidine | " | 3 |
| 102 | 2-Amino-6-β-sulphatoethyl-sulphonylnaphthalene-1-sulphonic acid | 1-Amino-naphthalene-6-sulphonic acid | 4,6-Difluor-5-chlor-pyrimidine | " | 3 |

EXAMPLE 103

Coupling of the diazonium salt solution of Example 1 with the condensation product from 2,4-diaminobenzene-sulphonic acid and 5-chloro-4,6-difluoropyrimidine, which is prepared at pH 4 and 40° C. in the presence of sodium carbonate solution, gives the dyestuff of the formula

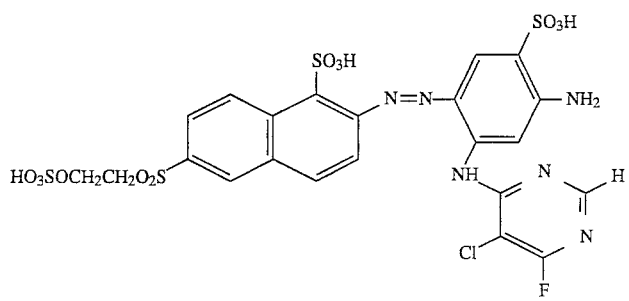

which dyes cotton in yellow hues.

EXAMPLE 104

Analogously to Example 103, the dyestuff of the formula

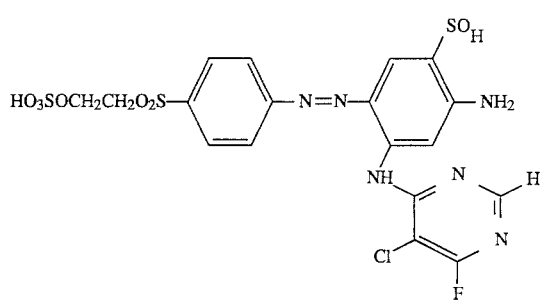

which dyes cotton in yellow hues is obtained by using the diazonium salt solution from Example 29.

EXAMPLE 105

0.1 mol of the azo dyestuff of the formula

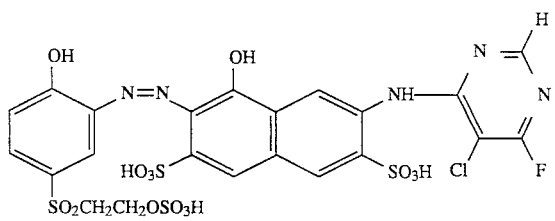

is dissolved in 1 l of water under neutral conditions. 28 g of copper sulphate (CuSO$_4$×5H$_2$O) are added at room temperature, and the pH is maintained between 5.5 and 6.5 by the simultaneous dropwise addition of sodium carbonate solution. After the coppering is completed, the dyestuff is salted out with sodium chloride, filtered off with suction, dried and ground.

This gives a dark powder, which is readily soluble in water and dyes cotton ruby by a dyeing process customary for reactive dyestuffs. The dyestuff conforms to the formula

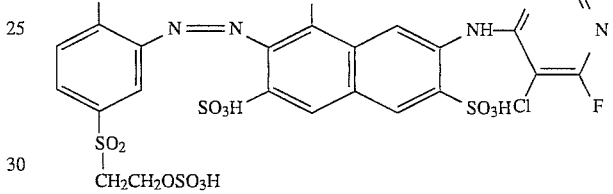

The azo dyestuff used in this example is obtained by diazotizing 2-amino-4-sulphatoethylsulphonyl-phenol and coupling the product at pH 5.5 to 6.5 to the condensation product which is obtained by acylation of 2-amino-8-hydroxynaphthalene-3,6-disulphonic acid with 5-chloro-4,6-difluoropyrimidine.

EXAMPLE 106

The condensation product from 1-hydroxy-3-sulpho-7-(2'-sulpho-4'-aminophenylamino)naphthalene and 5-chloro-4,6-difluoropyrimidine, which is prepared at pH 4 and 40° C., is added to the diazonium salt solution of 1-amino-4-sulphatoethylsulphonyl-benzene prepared analogously to Example 29. The dyestuff of the formula

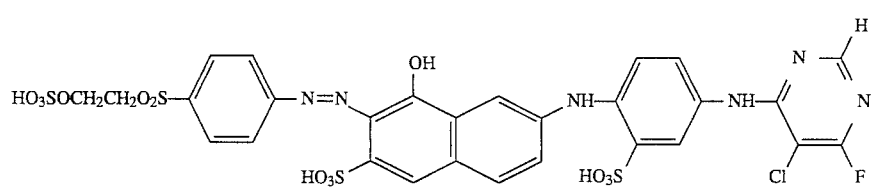

is prepared by adjusting the pH to 6 to 7 with sodium carbonate solution. After the coupling reaction is completed, the dyestuff is salted out, isolated, dried and ground. This gives a dark-brown powder, which is readily soluble in water and produces a brown dyeing on cotton.

EXAMPLE 107

0.1 mol of the dyestuff of the formula

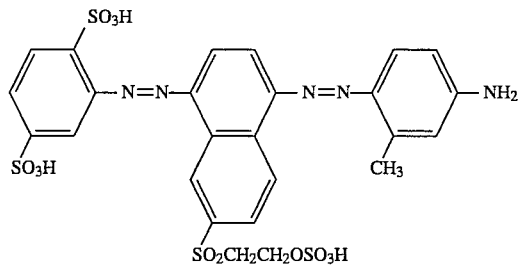

is dissolved in 1000 ml of water under neutral conditions, and 18.5 g of the reactive component mixture C are added dropwise at 15° C.–20° C., during which a pH of 6–7 is maintained by the addition of sodium bicarbonate powder. After the condensation is completed, the dyestuff is salted out, filtered off with suction, and dried. It is ground to give a brown dyestuff powder which dyes cotton in reddish brown hues (colour number 32). The dyestuff obtained conforms to the formula

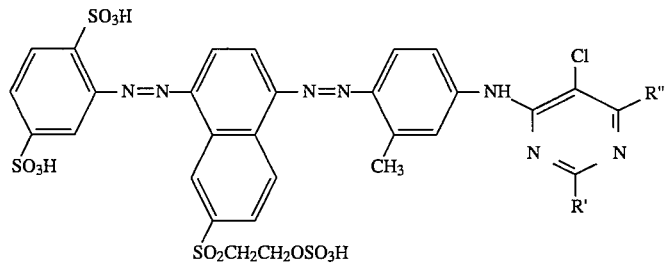

65% of R'=Cl, R"=F

35% of R'=F, R"=Cl

The dyestuff used in this example as starting material is obtained by coupling of diazotized 1-amino-2,5-disulphobenzene (diazo component) onto 1-amino-6 -β-sulphatoethylsulphonyl-naphthalene (middle component) at a pH of 3–4, diazotization of the monoazo dyestuff obtained and coupling onto m-toluidine (end component) at a pH of 3–4.

Further useful dyestuffs are obtained by the procedure of this example by using the diazo, middle, and end reactive components listed below, which leads to dyestuffs which produce reddish brown dyeings on cotton (colour number 32).

| Ex. | Diazo component | Middle component | End component | Reactive component |
|---|---|---|---|---|
| 108 | 2-Amino-4,6,8-trisulpho-naphthalene | 1-Amino-7-β-sulphato-ethylsulphonyl-naphthalene | m-toluidine | Mixture C |
| 109 | 2-Amino-4,6,8-trisulpho-naphthalene | 1-Amino-7-β-sulphato-ethylsulphonyl-naphthalene | " | " |
| 110 | 1-Amino-3,5,7-trisulpho-naphthalene | 1-Amino-7-β-sulphato-ethylsulphonyl-naphthalene | " | " |
| 111 | 2-Amino-4,6,8-trisulpho-naphthalene | 1-Amino-7-β-sulphato-ethylsulphonyl-naphthalene | " | " |
| 112 | 6-β-Sulphatoethyl-sulphonyl-8-sulpho-naphtalene | 1-Amino-7-sulpho-naphthalene | " | " |
| 113 | 2-Sulpho-4-β-sulphato-ethyl-sulphonyl-aniline | 1-Amino-7-sulpho-naphthalene | " | " |
| 114 | 2-Amino-naphthalene-4,8-disulphonic acid | 1-Amino-7-β-sulphatoethylsulphonyl-naphthalene | " | 5-Chlor-4,6-difluor-pyrimidine |
| 115 | 2-Amino-6-β-sulphatoethylsulphonyl-naphthalene-8-sulphonic acid | 1-Amino-6-naphthalene-sulphonic acid | " | 5-Chlor-4,6-difluor-pyrimidine |

-continued

| Ex. | Diazo component | Middle component | End component | Reactive component |
|---|---|---|---|---|
| 116 | 2-Amino-6-β-sulphatoethylsul-phonyl-naphthalene-8-sulpho-nic acid | 1-Amino-6-naphtha-lene-sulphonic acid | " | 5-Chlor-4,6-difluor-pyrimidine |
| 117 | 2-Amino-5-β-sulphatoethylsul-phonyl-naphthalene-8-sulphonic acid | 1-Amino-6-naphtha-lene-sulphonic acid | " | 5-Chlor-4,6-difluor-pyrimidine |

EXAMPLE 118

0.2 mol of the compound

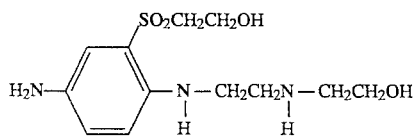

(prepared by reaction of 1-chloro-2-(β-hydroxyethylsulpho-nyl)-4-nitrobenzene with the glacial acetic acid adduct of the diamine of the formula

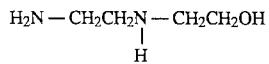

in isopropanol, followed by catalytic hydrogenation using Raney nickel and hydrogen) is condensed at 80° C. with 0.1 mol of chloranil in isopropanol in the presence of sodium acetate. The dark brown precipitated product of the formula

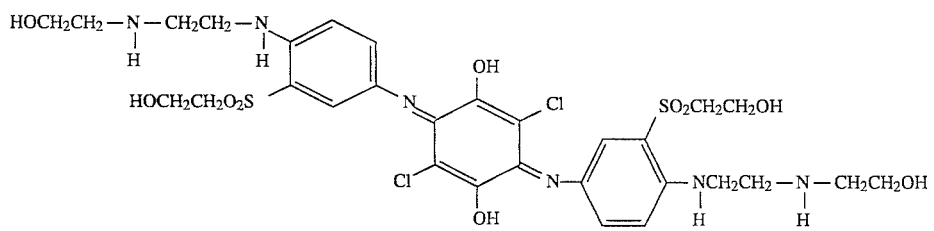

is filtered off with suction, dried, and stirred into ml of 20% strength oleum. 0.2 mol of potassium peroxodisulphate is added to this mixture, and stirring at 20° C.–25° C. is continued for several hours.

The mixture is then poured onto ice, the blue dyestuff base of structure

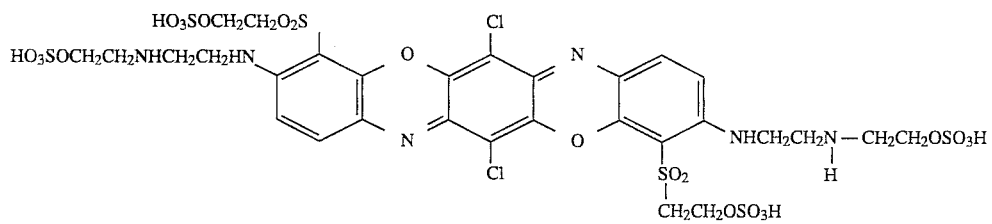

is isolated, suspended in water, and condensed with 0.2 mol of the mixture C of the reactive components at 0°–5° C. and a pH of 6.5 to 7.5.

The dyestuff is salted out with sodium chloride, isolated, dried, and ground. This gives a dark dyestuff powder which contains the dyestuff of the formula

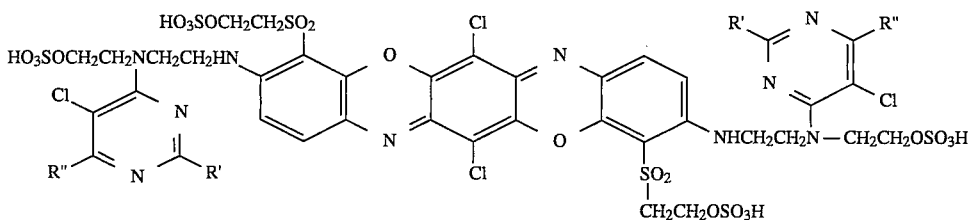

70% of R'=Cl, R"=F
30% of R'=F, R"=Cl and dyes cotton and wool in blue hues by the dyeing and printing methods customary for reactive dyestuffs (colour number 14).

EXAMPLE 119

If in Example 119 the pyrimidine derivative mixture C is replaced by 5-chloro-4,6-difluoropyrimidine, the dyestuff of the formula

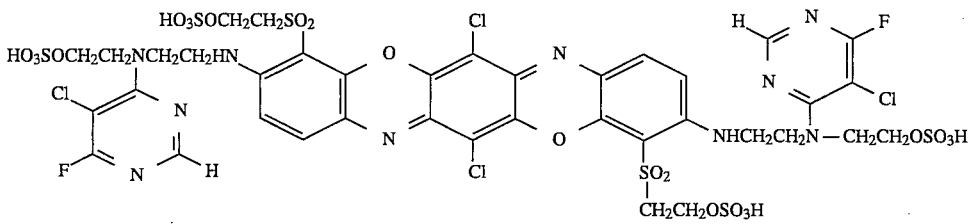

is obtained, which dyes cotton and wool in blue hues by the dyeing and printing methods customary for reactive dyestuffs.

EXAMPLE 120

52 g of the dyestuff 1-amino-4-(3'-amino-4' -β-hydroxyethylsulphonyl-phenylamino)anthraquinone-2-sulphonic acid (prepared by condensation of 4 -β-hydroxyethylsulphonyl-1,3-diaminobenzene and 1-amino-4 -bromoanthraquinone-2-sulphonic acid) are added in the form of a dry ground material with stirring into 200 g of sulphuric acid monohydrate.

The mixture is stirred overnight at room temperature, and the solution is then poured with stirring into a mixture of 500 g of ice and 150 g of potassium chloride.

The precipitated dyestuff is then filtered off with suction, washed with saturated sodium chloride solution, and dissolved in 300 parts of water with the addition of sodium bicarbonate under neutral conditions.

18.5 g of the mixture C of the reactive components are then added to the solution in powder form, the mixture is warmed to 20° to 30° C., and the pH is maintained between 5 and 6 by dropwise addition of sodium carbonate solution. After the condensation is completed, the mixture is clarified, and the dyestuff is precipitated from the filtrate by salting out. Using an application process customary for reactive dyestuffs, a clear blue dyeing which has good general fastness properties is produced on cotton (colour number 14). The dyestuff conforms to the formula

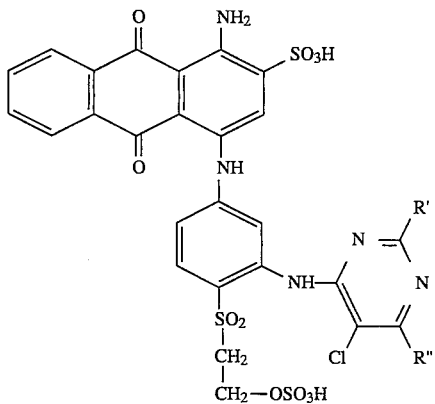

70% of R'=Cl, R"=F
30% of R'=F, R"=Cl

EXAMPLE 121

54 g of the dyestuff 1-amino-4-(2'-methyl-5' -amino-4'-β-hydroxyethylsulphonyl-phenylamino)anthraquinone-2-sulphonic acid (prepared by condensation of 1-amino-4-bromoanthraquinone-2-sulphonic acid and 5 -β-hydroxyethylsulphonyl-2,4-diaminotoluene) are reacted analogously to Example 120.

This gives the dyestuff of the formula

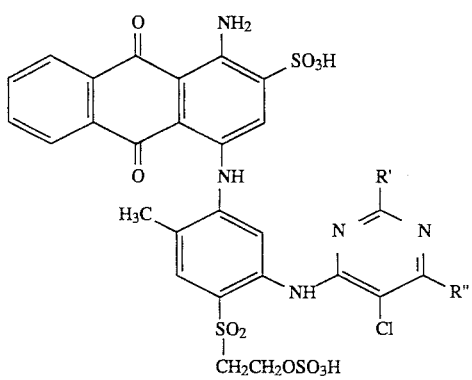

70% of R'=Cl, R''=F
30% of R'=F, R''=Cl which produces on wool and cotton a clear blue dyeing which has good fastness properties (colour number 14).

The following dyestuffs can also be prepared by the procedure of Example 120 by using the corresponding intermediates:

EXAMPLE 122

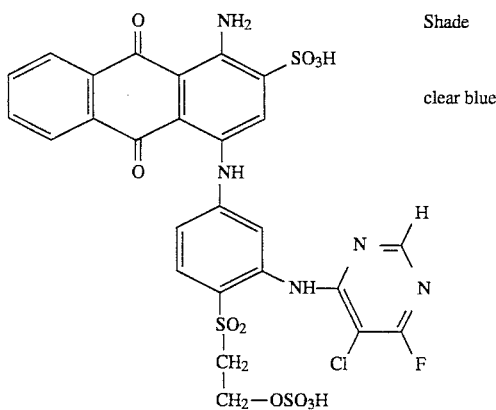

Shade clear blue

EXAMPLE 123

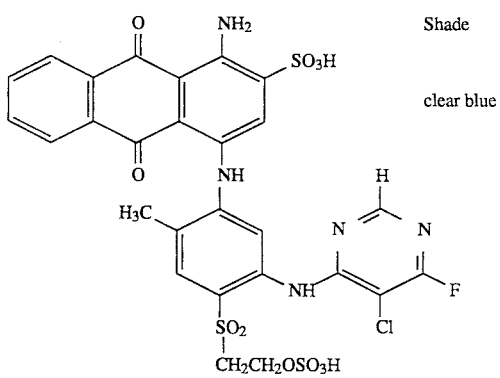

Shade clear blue

EXAMPLE 124

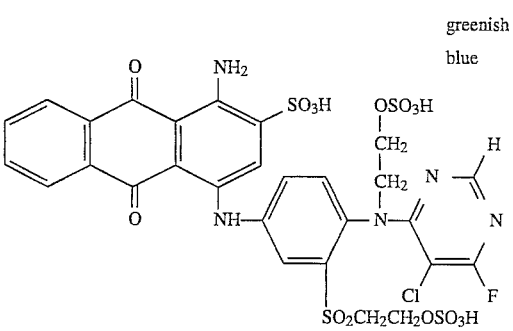

greenish blue

EXAMPLE 125

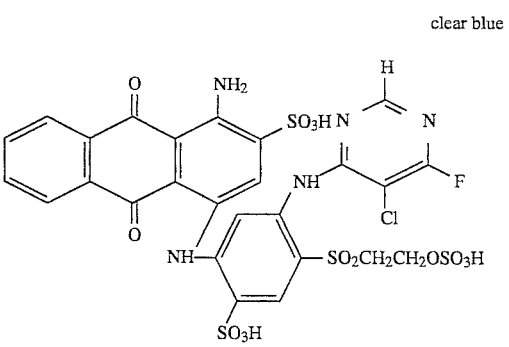

clear blue

EXAMPLE 126

23.2 g of 2-carboxyphenylhydrazine-4-sulphonic acid and 21.3 g of 4-acetaminobenzaldehyde-2-sulphonic acid are condensed in aqueous solution, and the hydrazone obtained is coupled in the presence of sodium carbonate and 25 g of copper sulphate with the diazonium compound from 22.7 g of 2-amino-4-(β-hydroxyethylsulphonyl)phenol. After the reaction is completed, the product is hydrolysed at 100° C. with the addition of 15 g of sodium carbonate until complete hydrolysis of the acetyl group can be verified by thin-layer chromatography. The dyestuff is then precipitated by the addition of sodium chloride, isolated and dried. The dyestuff is ground and added with stirring to pyridine.

The mixture is heated to 80° C., and the same amount of sulphamic acid as that of the dyestuff powder is added. This causes the temperature to rise to 105° C. Stirring at 100°–105° C. is continued for another ½ hour. Pyridine is then removed by distillation and drying in vacuo, and the residue is dissolved in water and condensed with 18.5 g of mixture C of the reactive components at 20° C. and a pH of 6 to 6.5.

After the reaction is completed, the dyestuff is precipitated with sodium chloride, isolated and dried. It is ground to give a dyestuff powder which contains the sodium salt of the compound of the formula

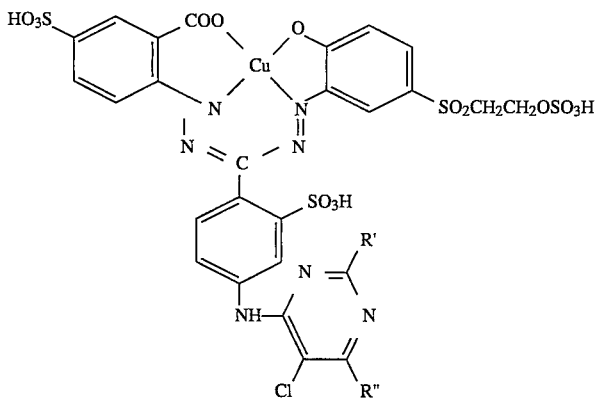

70% of R'=Cl, R"=F
30% of R'=F, R"=Cl
and dyes cotton in a blue shade.

difluoropyrimidine instead of the reactive component C. The dyestuffs dye cotton in blue hues.

EXAMPLE 129

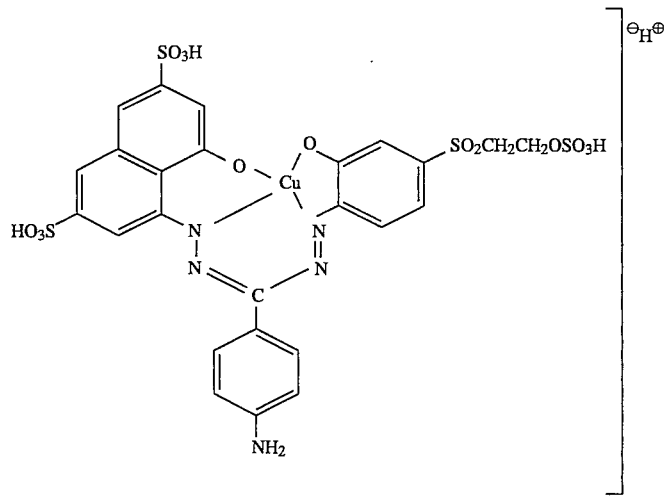

Further blue reactive dyestuffs according to the invention are obtained by reacting, as described in Example 126, the following phenylhydrazines and aromatic aldehydes to give hydrazones, coupling the hydrazones in the presence of $CuSO_4$ with the diazo component also listed below, and hydrolysing, sulphating, and acylating the dyestuffs formed with mixture C of the reactive components analogously to Example 126.

| Ex. | Phenylhydrazine | Aldehyde | Diazo component |
|-----|-----------------|----------|-----------------|
| 127 | 2-Carboxy-5-(β-hydroxyethyl-sulphonyl)phenyl-hydrazine | Benzaldehyde | 3-Acetylamino-4-hydroxy-5-amino-benzenesulphonic acid |
| 128 | 2-Carboxy-4-acetyl-aminophenylhydrazine | Benzaldehyde | 4-β-Hydroxyethyl-sulphonyl-2-aminophenol-6-sulphonic acid |

Further useful dyestuffs are obtained by using in Examples 126–128 the reactive component 5-chloro-4,6- is dissolved in 1700 ml of water and condensed at pH 6.5 and 40°–50° C. with 1.05 mol of 5-chloro-4,6-difluoropyrimidine, while neutralizing the liberated acid with 20% strength sodium carbonate solution.

The dyestuff used in the reaction is prepared as follows:
8-Hydrazino-1-(phenylsulphonyloxy)napthalene-3,6-disulphonic acid is stirred in water and condensed at pH 5 with 4-acetylaminobenzaldehyde to the hydrazone. 2-Amino-5-(β-hydroxyethylsulphonyl)phenol is stirred in water and diazotized in the presence of copper sulphate solution with sodium nitrite solution. This copper-containing diazonium salt solution is added to the hydrazone, and the coupling is carried out at pH 11 by means of sodium hydroxide solution. The mixture is then heated to 70° C., thus hydrolyzing the phenylsulphonyl group. The acetylamino group is hydrolyzed by adding a further 10% by volume of a 40% strength sodium hydroxide solution and heating at 95° C. for 4 hours. The solution is saturated with sodium chloride while hot, adjusted to a pH of 7 with hydrochloric acid, and stirred in the cold. The dyestuff base obtained after filtration is sulphated in accordance with DE-A 1,443,877.

After the condensation with the pyrimidine derivative is completed, the dyestuff is salted out, isolated, and dried.

This gives a dark dyestuff powder which contains the compound of the formula

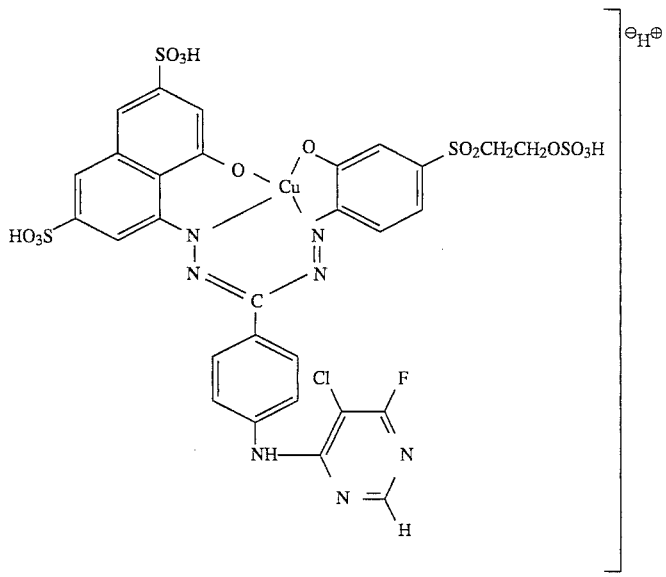

and dyes cotton in grey-green hues.

| Ex. | Aldehyde | 2-Aminophenol component | Metal Salt | Reactive radical | Hue |
|---|---|---|---|---|---|
| 130 | 3-NHCOCH₃-C₆H₄-CHO | 2-H₂N, 1-OH, 4-SO₂CH₂CH₂OH phenyl | CuSO₄ | 5-chloro-4-fluoropyrimidinyl | grey-green |
| 131 | 4-(HOCH₂CH₂O₂S)-C₆H₄-CHO | 2-H₂N, 1-OH, 6-NHCOCH₃, 4-SO₃H phenyl | " | " | gray |
| 132 | " | 2-H₂N, 1-OH, 6-SO₃H, 4-NHCOCH₃ phenyl | " | " | gray |

Analogously to Example 127, further interesting dyestuffs are obtained by condensing the hydrazine from Example 127 with the aldehydes listed in the table below to give hydrazones, diazotizing the 2-aminophenol component mentioned, coupling the product in the presence of a metal salt, hydrolysing the phenylsulphonyl ester and the acylamino group, subsequently sulphating the product and finally condensing it with 5-chloro-4,6-difluoropyrimidine. The reactive dyestuffs thus obtained produce on cellulose materials dyeings and prints in the hues mentioned, which have excellent fastness properties.

We claim:

1. A reactive dyestuff of the formula

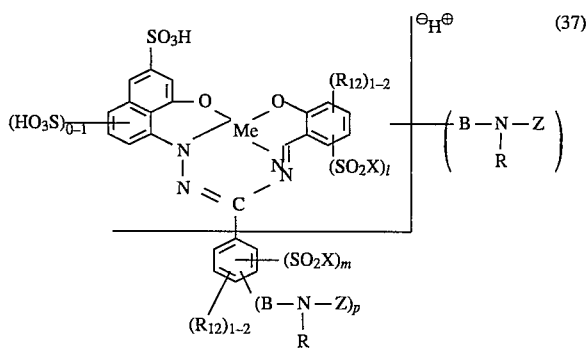

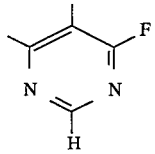

in which

X is CH=CH$_2$ or CH$_2$CH$_2$—Y in which

Y is a radical which can be eliminated by alkali,

B is a direct bond or a bridge member selected from the group consisting of

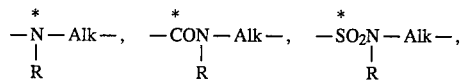

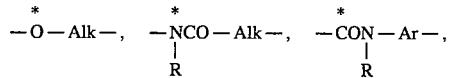

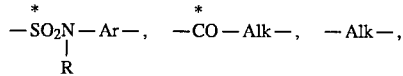

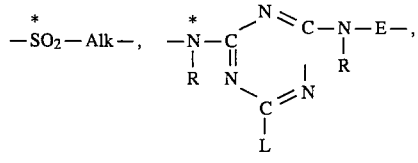

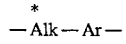

or in which

* indicates the point of linkage with the phenyl ring

Alk is a straight-chain or branched C$_1$–C$_6$-alkylene which is uninterrupted or interrupted by a heteroatom or a grouping which contains a heteroatom, Ar is substituted or unsubstituted phenylene or naphthylene or the radical of a diphenyl or stilbene, E is Alk or Ar of-Alk-Ar- in which Alk or Ar contain no further substituents, or contain as a substitutent F, Cl, Br, C$_1$–C$_4$-alkyl, C$_1$–C$_4$-alkoxy, carboxyl or sulpho, L is F, Cl, Br, amino, OH, C$_1$–C$_4$-alkoxy, phenoxy or C$_1$–C$_4$-alkylthio, R is H or unsubstituted C$_1$–C$_4$-alkyl, or C$_1$–C$_4$-alkyl substituted by halogen, hydroxyl, cyano, C$_1$–C$_4$-alkoxy, carboxy or sulfo, Z is a fiber reactive radical of the formula

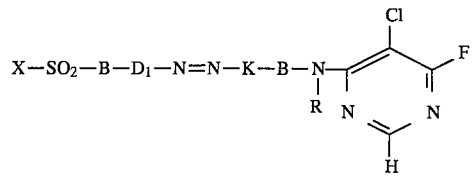

and

R$_{12}$ denotes H, C$_1$–C$_4$-alkyl, C$_1$–C$_4$-alkoxy, OH, halogen, COOH, NO$_2$, SO$_3$H, sulphonamido, C$_1$–C$_4$-alkylcarbonylamino, phenylcarbonylamino, C$_1$–C$_4$-alkylsulphonylamino or phenylsulphonylamino, l, m, p denote 0 or one where l≠m, m≠p, and Me is Fe, Cu or Ni.

2. A reactive dyestuff of the formula

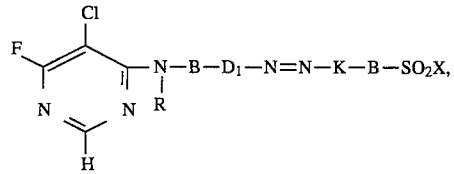

or

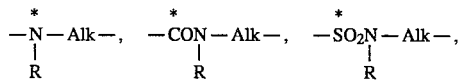

wherein

D$_1$ is phenylene which is unsubstituted or substituted by SO$_3$H, chlorine, C$_1$–C$_4$-alkoxy, C$_1$–C$_4$-alkyl, carbalkoxy or sulphonamido; naphthylene which is unsubstituted or substituted by SO$_3$H, chlorine, C$_1$–C$_4$-alkoxy or C$_1$–C$_4$-alkyl; 4-(phenylazo)phenylene which is unsubstituted or substituted SO$_3$H or biphenylene which is unsubstituted or substituted by SO$_3$H, and K is the radical of a coupling component of a hydroxybenzene, hydroxynaphthalene, aminobenzene, aminonaphthalene or aminohydroxy naphthalene or represents 5-hydroxy-3-methyl-pyrazole, 5-hydroxy-3-carboxypyrazole or 6-hydroxy-2-pyridone or an acetoacetylarylide radical which is unsubstituted or ring substituted by C$_1$–C$_4$-alkyl or C$_1$–C$_{14}$-alkoxy, X is CH=CH$_2$ or CH$_2$CH$_2$—Y in which Y is a radical which can be eliminated by alkali, B is a direct bond or a bridge member to a ring carbon atom of an aromaticcarbocyclic ring or to a ring carbon atom or nitrogen atom of an aromaticheterocyclic ring in D$_1$, wherein the bridge member B is a radical selected from the group consisting of

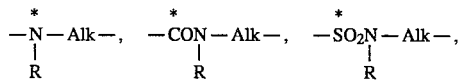

-continued

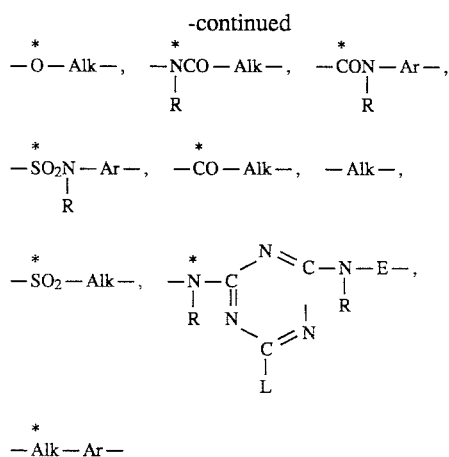

or which

* indicates the point of linkage with $D_1$ or K,

Alk is a straight-chain or branched $C_1$–$C_6$-alkylene which is uninterrupted or interrupted by a heteroatom or a grouping which contains a heteroatom, Ar is substituted or unsubstituted phenylene or naphthylene or the radical of a diphenyl or stilbene, E is Alk or Ar or-Alk-Ar- in which Alk or Ar contain no further substituents, or contain as a substitutent F, Cl, Br, $C_1$–$C_4$-alkyl, $C_1$–$C_4$-alkoxy, carboxyl or sulpho, L is F, Cl, Br, amino, OH, $C_1$–$C_4$-alkoxy, phenoxy or $C_1$–$C_4$-alkylthio, and R is H or unsubstituted $C_1$–$C_4$-alkyl, or $C_1$–$C_4$-alkyl substituted by halogen, hydroxyl, cyano, $C_1$–$C_4$-alkoxy, carboxy or sulfo.

3. A dyestuff according to claim 2 of the formula

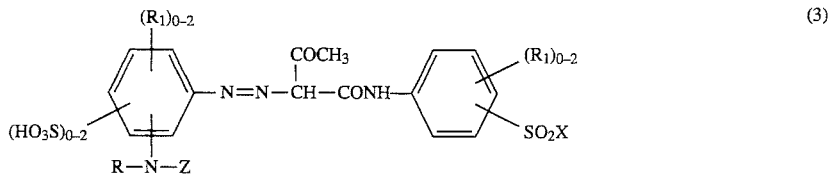

(3)

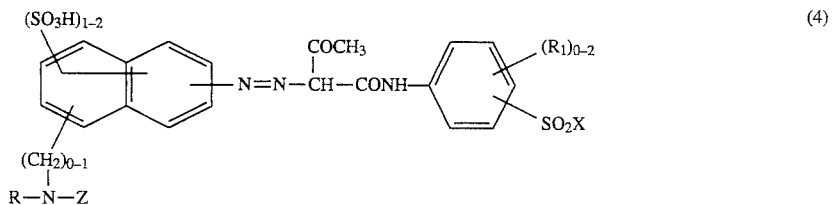

(4)

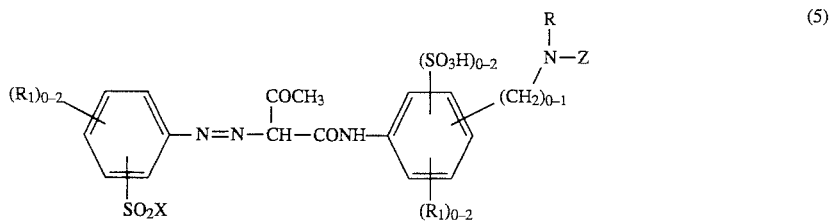

(5)

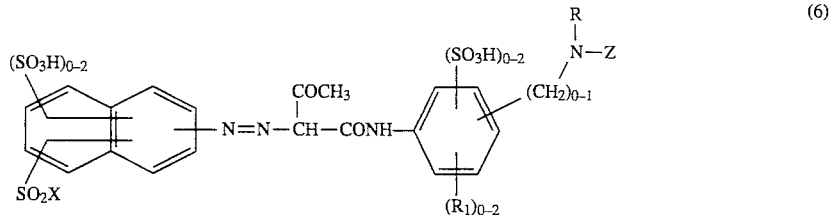

(6)

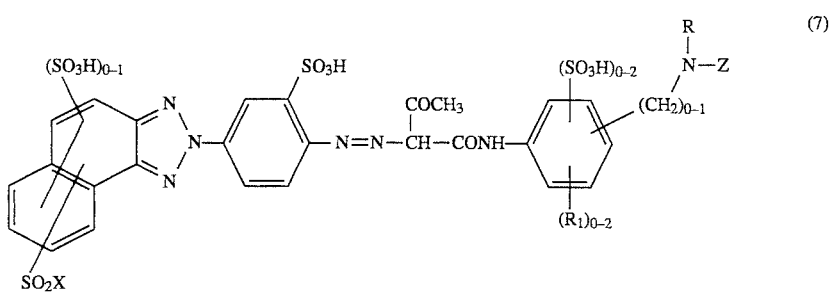

(7)

-continued
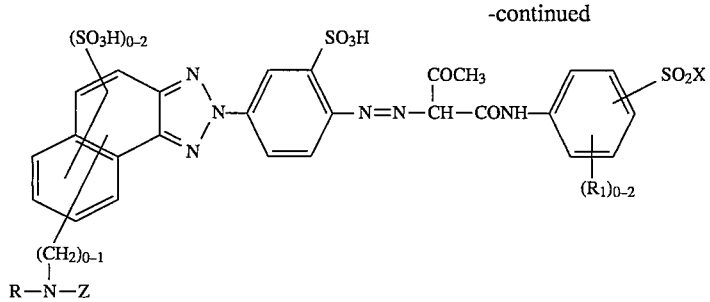 (8)
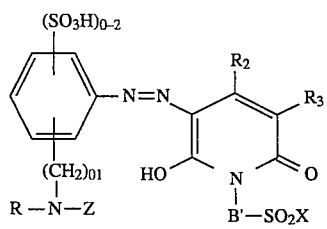 (9)
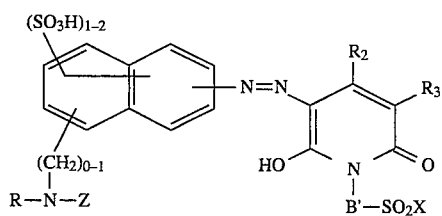 (10)
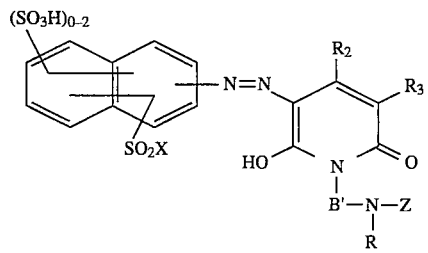 (11)
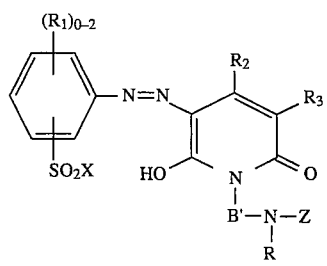 (12)
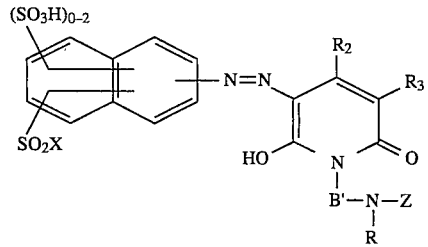 (13)

-continued
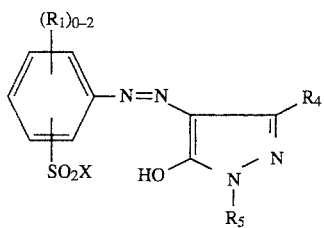 (14)
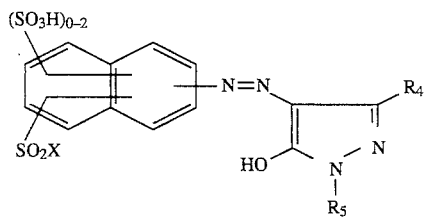 (15)
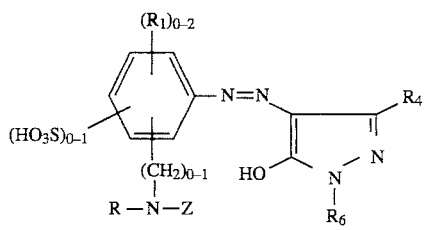 (16)
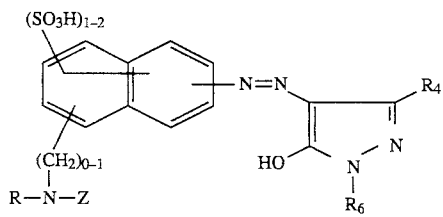 (17)
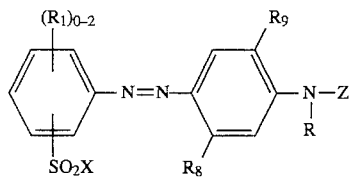 (18)
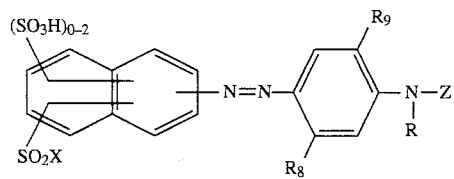 (19)
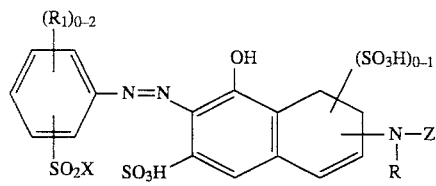 (20)
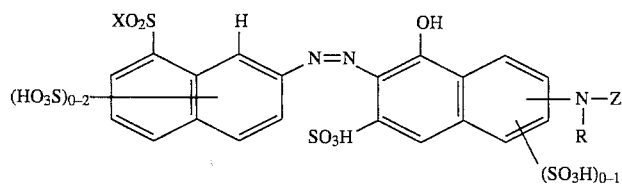 (21)

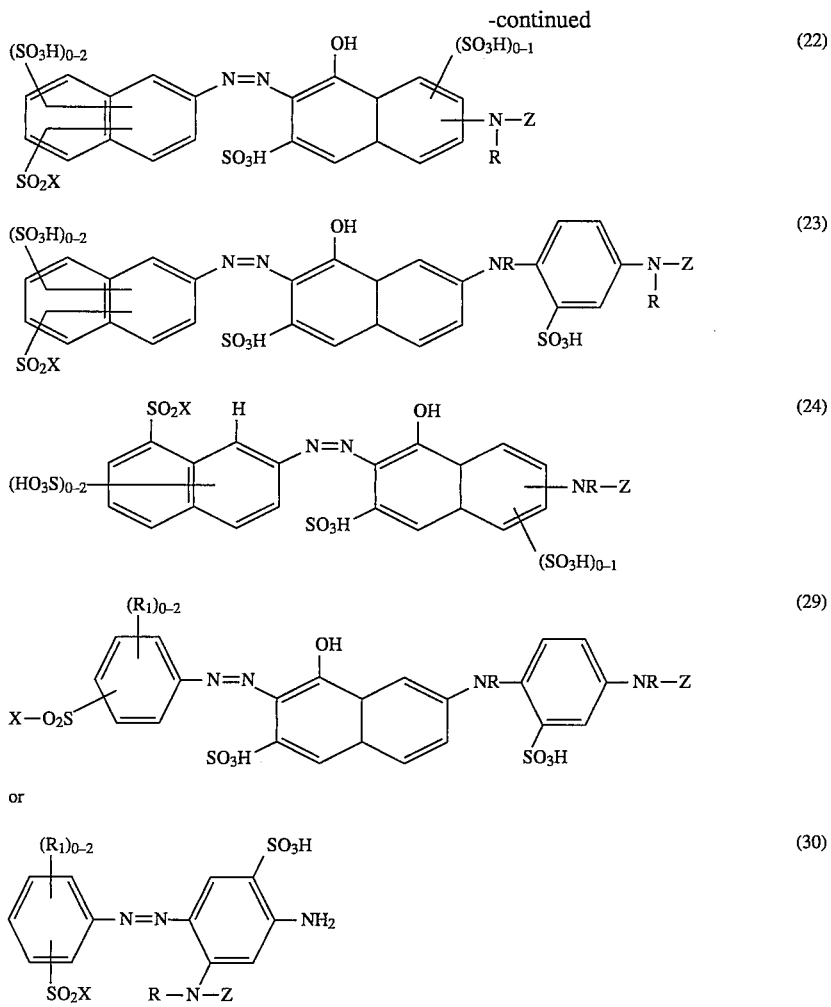

in which
- $R^1$ denotes $C_1$-$C_4$-alkyl, $C_1$-$C_4$-alkoxy, Cl, Br, $SO_3H$ or COOH,
- $R_2$ denotes H, $C_1$-$C_4$-alkyl, COOH or $CH_2SO_3H$,
- $R_3$ denotes H, $SO_3H$, $CH_2SO_3H$, Cl, $CONH_2$, mono- and di-$C_1$-$C_4$-alkylcarboxamide or $C_1$-$C_4$-alkylsulphonyl,
- $R_4$ denotes $CH_3$ or COOH,
- $R_5$ denotes

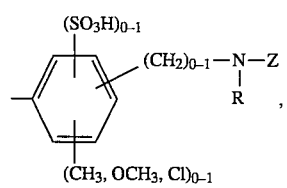

- $R_6$ denotes

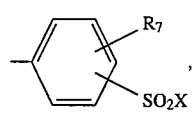

- $R_7$ denotes H, $C_1$-$C_4$-alkyl, $C_1$-$C_4$-alkoxy, Cl, Br, COOH or $SO_3H$,
- $R_8$ denotes H, $C_1$-$C_4$-alkyl, $C_1$-$C_4$-alkoxy, $C_1$-$C_4$-alkylcarbonylamino, $C_1$-$C_4$-alkylsulphonylamino, aminocarbonylamino, phenylcarbonylamino, Cl or Br,
- $R_9$ denotes H, $C_1$-$C_4$-alkyl, $C_1$-$C_4$-alkoxy, OH or $SO_3H$,
- B' denotes

and
- Z is a fiber reactive radical of the formula

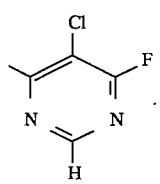

* * * * *

UNITED STATES PATENT AND TRADEMARK OFFICE
CERTIFICATE OF CORRECTION

PATENT NO. : 5,463,031
DATED : October 31, 1995
INVENTOR(S) : Jager, et al.

It is certified that error appears in the above-indentified patent and that said Letters Patent is hereby corrected as shown below:

Title Page, item [75] Inventors: 3rd Inventor after " Karl " delete " K. " and substitute -- H. --

Title Page, item [56] FOREIGN PATENT DOCUMENTS: delete " 272523 " and substitute -- 272532 --

Col. 76, line 46  After " B' denotes " insert -- -(CH$_2$)$_{2-4}$, --

Signed and Sealed this

Twenty-sixth Day of November 1996

Attest:

BRUCE LEHMAN

Attesting Officer         Commissioner of Patents and Trademarks